United States Patent
Otsuka et al.

(10) Patent No.: US 9,996,410 B2
(45) Date of Patent: Jun. 12, 2018

(54) NON-TRANSITORY COMPUTER-READABLE RECORDING MEDIUM STORING PROGRAM FOR SIGN DETECTION, SIGN DETECTION DEVICE, AND SIGN DETECTION METHOD

(71) Applicant: FUJITSU LIMITED, Kawasaki-shi, Kanagawa (JP)

(72) Inventors: Hiroshi Otsuka, Kawasaki (JP); Yukihiro Watanabe, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 15/140,871

(22) Filed: Apr. 28, 2016

(65) Prior Publication Data
US 2016/0335146 A1 Nov. 17, 2016

(30) Foreign Application Priority Data
May 11, 2015 (JP) ................. 2015-096512

(51) Int. Cl.
*G06F 11/00* (2006.01)
*G06F 11/07* (2006.01)

(52) U.S. Cl.
CPC ........ *G06F 11/079* (2013.01); *G06F 11/0706* (2013.01); *G06F 11/0751* (2013.01); *G06F 11/0772* (2013.01)

(58) Field of Classification Search
CPC ............. G06F 11/0751; G06F 11/0706; G06F 11/0772; G06F 11/079
See application file for complete search history.

(56) References Cited

U.S. PATENT DOCUMENTS

| | | | |
|---|---|---|---|
| 9,442,785 B2 * | 9/2016 | Watanabe | G06F 11/0727 |
| 9,690,639 B2 * | 6/2017 | Iikura | G06F 11/0706 |
| 2011/0208679 A1 | 8/2011 | Watanabe et al. | |
| 2012/0166879 A1 * | 6/2012 | Watanabe | G06F 11/0751 714/37 |
| 2012/0191442 A1 | 7/2012 | Hasegawa | |
| 2012/0221903 A1 * | 8/2012 | Ohnuma | G11C 29/10 714/720 |

FOREIGN PATENT DOCUMENTS

| | | |
|---|---|---|
| JP | 2010-108223 | 5/2010 |
| JP | 2010-231568 | 10/2010 |
| JP | 2011-170802 | 9/2011 |
| WO | WO 2012/029500 A1 | 3/2012 |

\* cited by examiner

*Primary Examiner* — Charles Ehne
(74) *Attorney, Agent, or Firm* — Staas & Halsey LLP

(57) ABSTRACT

A non-transitory computer-readable recording medium having stored therein a program for causing a computer to execute a process for detecting a sign, the process includes obtaining message information output from one or a plurality of information processing devices; obtaining configuration information in the one or the plurality of information processing devices; storing the obtained message information and the obtained configuration information in a common format; and outputting predetermined message information and predetermined configuration information according to comparison of a predetermined pattern described in the common format and the message information and the configuration information stored in the common format.

19 Claims, 44 Drawing Sheets

FIG. 8

| id | FILE NAME | KEY | VALUE |
|---|---|---|---|
| 1 | /var/log/messages | MSGTYPE0 | MSGSUBTYPE0 |
| 2 | /var/log/messages | MSGTYPE4 | MSGSUBTYPE8 |

| FAILURE TYPE | KEY | VALUE $V_A$ | VALUE $V_B$ |
|---|---|---|---|
| F001 | /etc/my.cnf:port | 3306 | 3309 |
| F001 | /proc/sys/kernel/random/entropy_avail | 100 | 150 |
| F001 | /var/log/messages.abstracted.MSGTYPE0 | MSGSUBTYPE0 | MSGSUBTYPE1 |
| F001 | /var/log/messages.abstracted.MSGTYPE4 | MSGSUBTYPE8 | MSGSUBTYPE7 |

| FAILURE TYPE | KEY | CORRECTNESS | VALUE | NUMBER OF TIMES |
|---|---|---|---|---|
| F001 | /etc/my.cnf:port | Failure | 3305 | 1 |
| F001 | /etc/my.cnf:port | Failure | 3307 | 1 |
| F001 | /etc/my.cnf:port | Failure | 3308 | 1 |
| F001 | /etc/my.cnf:port | Success | 3309 | 3 |
| F002 | /etc/resolv.conf:nameserver | Success | 192.168.0.1 | 2 |
| F002 | /etc/resolv.conf:nameserver | Failure | 192.168.0.2 | 1 |
| F002 | /etc/resolv.conf:nameserver | Failure | 192.16.0.1 | 1 |
| F001 | /var/log/messages.abstracted:MSGTYPE0 | Failure | MSGSUBTYPE0 | 1 |
| F001 | /var/log/messages.abstracted:MSGTYPE4 | Failure | MSGSUBTYPE8 | 1 |
| F001 | /var/log/messages.abstracted:MSGTYPE0 | Success | MSGSUBTYPE1 | 1 |
| F001 | /var/log/messages.abstracted:MSGTYPE4 | Success | MSGSUBTYPE7 | 1 |

| FAILURE TYPE | KEY | NUMBER OF TIMES $N_S$ | NUMBER OF TIMES $N_F$ |
|---|---|---|---|
| F001 | /etc/my.cnf:port | 3 | 3 |
| F002 | /etc/resolv.conf:nameserver | 2 | 2 |
| F001 | /var/log/messages.abstracted:MSGTYPE0 | 1 | 1 |
| F001 | /var/log/messages.abstracted:MSGTYPE4 | 1 | 1 |

| FAILURE TYPE | KEY | SPECIFIC SCORE $S_s$ | SPECIFIC SCORE $S_f$ |
|---|---|---|---|
| F001 | /etc/my.cnf:port | 0 | 0.48 |
| F001 | /var/log/messages.abstracted:MSGTYPE0 | 0 | 0.48 |

| FAILURE TYPE | KEY | VALUE | SCORE |
|---|---|---|---|
| F001 | /etc/httpd/conf/httpd.conf:MaxClients | 100 | 0.75 |
| F001 | /var/log/messages.abstracted:MSGTYPE01 | MSGSUBTYPE01 | 1.00 |

CONFIGURATION INFORMATION AND LOG INFORMATION
IN NORMAL TIME
COLLECTED TIME: 7/12/2014 00:01:55

98

/etc/my.cnf.port = 3306
/etc/resolv.conf.nameserver = 192.168.0.1
/proc/sys/kernel/random/entropy_avail = 100

| FAILURE TYPE | KEY | CORRECTNESS | VALUE | NUMBER OF TIMES |
|---|---|---|---|---|
| F001 | /etc/my.cnf:port | Success | 3309 | 3 |
| F002 | /etc/resolv.conf:nameserver | Success | 192.168.0.1 | 2 |
| F001 | /var/log/messages.abstracted:MSGTYPE0 | Success | MSGSUBTYPE1 | 1 |
| F001 | /var/log/messages.abstracted:MSGTYPE4 | Success | MSGSUBTYPE7 | 1 |

/etc/my.cnf:port = 3306
/etc/my.cnf:user = mysql
/etc/httpd/conf/httpd.conf:Listen = 80
/etc/httpd/conf/httpd.conf:MaxClients = 100

131A

/etc/my.cnf:port = 3309
/etc/my.cnf:user = mysql
/etc/httpd/conf/httpd.conf:Listen = 80
/etc/httpd/conf/httpd.conf:MaxClients = 512

/etc/my.cnf.concretized 8-27-2014 23:55:00, port 3306

8-28-2014 00:00:00, port 3306

...

8-28-2014 00:25:00, port 3309

8-28-2014 00:30:00, port 3309

| MESSAGE PATTERN | TOTAL NUMBER OF DETECTION | NUMBER OF TIMES OF DETECTION | | | | | |
|---|---|---|---|---|---|---|---|
| | | FAILURE 1 | FAILURE 2 | ... | FAILURE j | ... | FAILURE n |
| PATTERN 1 | 4 | 2 | 2 | ... | 0 | ... | 0 |
| PATTERN 2 | 0 | 0 | 0 | ... | 0 | ... | 0 |
| PATTERN 3 | 89 | 0 | 80 | ... | 0 | ... | 0 |
| ... | ... | ... | ... | ... | ... | ... | ... |
| PATTERN i | 9 | 8 | 0 | ... | 1 | ... | 0 |
| ... | ... | ... | ... | ... | ... | ... | ... |
| | 0 | 0 | 0 | ... | 0 | ... | 0 |

| TIME | FAILURE TYPE | DETECTION PATTERN | CO-OCCURRENCE PROBABILITY |
|---|---|---|---|
| 04-12-2012T16:16:00-09:00 | T001 | [0005, 0007, 0012, 0019] | 0.80 |

| FAILURE | MESSAGE PATTERN | TOTAL NUMBER OF GENERATION | NUMBER OF GENERATION BEFORE FAILURE | CO-OCCURRENCE PROBABILITY |
|---|---|---|---|---|
| T999 | [0005, 0007, 0036] | 270 | 270 | 1.00 |

FIG. 50

| TIME | FAILURE TYPE | DETECTION PATTERN | CO-OCCURRENCE PROBABILITY |
|---|---|---|---|
| 04-12-2012T16:16:00-09:00 | T999 | [0005, 0007] | 1.00 |

803

NON-TRANSITORY COMPUTER-READABLE RECORDING MEDIUM STORING PROGRAM FOR SIGN DETECTION, SIGN DETECTION DEVICE, AND SIGN DETECTION METHOD

CROSS-REFERENCE TO RELATED APPLICATION

This application is based upon and claims the benefit of priority of the prior Japanese Patent Application No. 2015-096512, filed on May 11, 2015, the entire contents of which are incorporated herein by reference.

FIELD

The embodiments discussed herein are related to a sign detection program, device, and method.

BACKGROUND

A sign detection of generation of system failure is performed by analyzing information relating to operation of a system. As causes of system failure, there are cases where there is a setting error of configuration information of the system, an operational situation of the system is changed, or the like. As a method of the sign detection of the system failure, there are methods of analyzing change of a set value of the configuration information and analyzing the operational situation according to change of logs such as events or messages that are output from the system.

As a method for detecting failure events, for example, there are methods for collecting system history information including system log information and/or failure information and system configuration information, and the log information and/or the failure information are converted into a unified data format in advance. In this method, there is stored symptom in which addition information including partial configuration information is added to a detection rule for detecting an event included in components associated with failure that has been generated. In addition, the degree of coincidence is calculated for each piece of the stored partial configuration information by comparing the obtained system configuration information and the partial configuration information added to the symptom and stored in the symptom, and an event in which the failure has generated is detected based on the calculated the degree of coincidence.

In addition, there is also a method of learning message patterns that have been observed and using the patterns in detection of the failure.

Japanese Laid-open Patent Publication No. 2010-108223, Japanese Laid-open Patent Publication No. 2010-231568, Japanese Laid-open Patent Publication No. 2011-170802, and International Publication Pamphlet No. WO 2012/029500 are examples of the related art.

SUMMARY

According to an aspect of the invention, a non-transitory computer-readable recording medium having stored therein a program for causing a computer to execute a process for detecting a sign, the process includes obtaining message information output from one or a plurality of information processing devices; obtaining configuration information in the one or the plurality of information processing devices; storing the obtained message information and the obtained configuration information in a common format; and outputting predetermined message information and predetermined configuration information according to comparison of a predetermined pattern described in the common format and the message information and the configuration information stored in the common format.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of an abstracted message list;

FIG. 14 is a diagram illustrating an example of a pattern list;

FIG. 15 is a diagram illustrating an example of a learning data list;

FIG. 16 is a diagram illustrating an example of a count data list;

FIG. 17 is a diagram illustrating an example of a specific score list;

FIG. 18 is a diagram illustrating an example of a sign detection result list;

FIG. 26 is a diagram illustrating an example of case data;

FIG. 28 is a diagram illustrating an example of a learning data list;

FIG. 34 is a diagram illustrating an example of a set of the set value list;

FIG. 35 is a diagram illustrating an example of converted files;

FIG. 39 is a diagram illustrating an example of a co-occurrence probability list;

FIG. 41 is a diagram illustrating an example of a sign detection list;

FIG. 49 is a diagram illustrating an example of learning data; and

FIG. 50 is a diagram illustrating an example of a sign detection result list.

DESCRIPTION OF EMBODIMENTS

In the method for analyzing the change of a set value of the configuration information of the related art, it is possible to detect error of only a set value of configuration information. There is a problem that it is difficult to detect a case where an error of a set value is a problem when a system is in a specific situation. For example, in a case where system failure is generated by applying a load exceeding an assumed normal load to a system, a set value, which is set by assuming a normal state, is considered as an error in a situation where the load that exceeds the normal state is applied. However, since the set value is correct in the normal state, it is difficult to perform sign detection of system failure, using a method of detecting error of only a set value of the configuration information of the related art in this case.

Meanwhile, in a method of analyzing an operational situation according to change of log, it is possible to perform sign detection of system failure according to the operational situation in a system. However, it is difficult to determine whether the system failure is caused by a setting error in the setting of the configuration information or, as described above, by an error generated in a set value due to a specific situation of a system.

In addition, even in a case where, as described above, correctness of a set value of the configuration information according to a system situation is changed, it is considered that system failure may be detected by using individual analysis methods in the configuration information and log. However, in a case where failure to be generated is not associated with the configuration information and the log, there is a problem that the system failure may not be detected due to an error of a set value of which the correctness is changed according to a system situation.

An aspect of an exemplary embodiment aims to detect a sign of failure due to the change of the correctness of a set value of the configuration information according to a system situation.

Hereinafter, embodiments according to technology disclosed with reference to drawings will be described.

In the first embodiment, a data format is unified to a format of configuration information, and the configuration information and the log information are analyzed in a single algorithm at the same time, by converting a data format of the log information into a format of the configuration information. Here, the log information represents a group of one or a plurality of log files. The log information is an example of message information of disclosed technology. In addition, the format of the configuration information is an example of a common format of disclosed technology.

Figure 1:
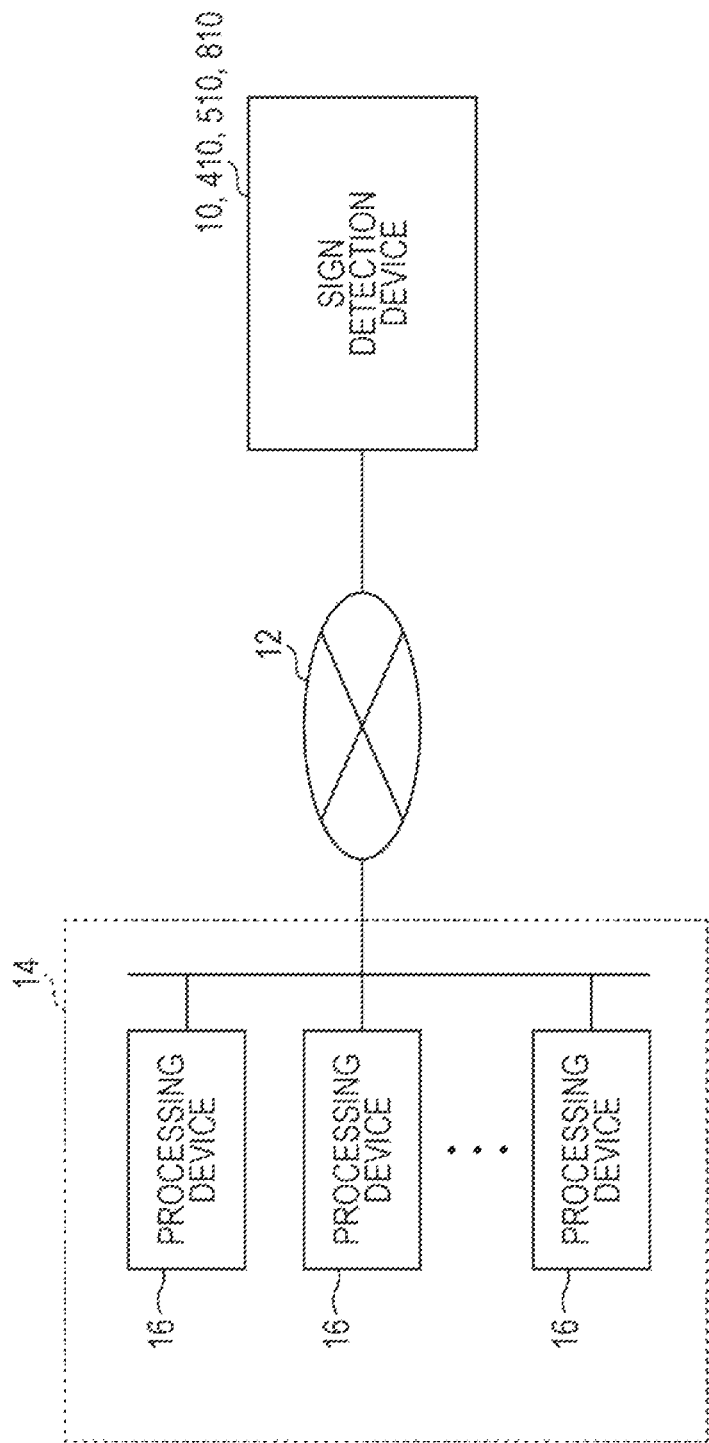
FIG. 1 is a diagram illustrating an example of the entirety of a system configuration according to a first embodiment to a fourth embodiment.

As described in FIG. 1, a sign detection device 10 according to a first embodiment is connected to a processing system 14 including a plurality of processing devices 16 through a network 12 such as the Internet, or the like. The sign detection device 10 monitors each of the processing devices 16, and detects a sign of the generation of failure in the processing devices 16.

Figure 2:
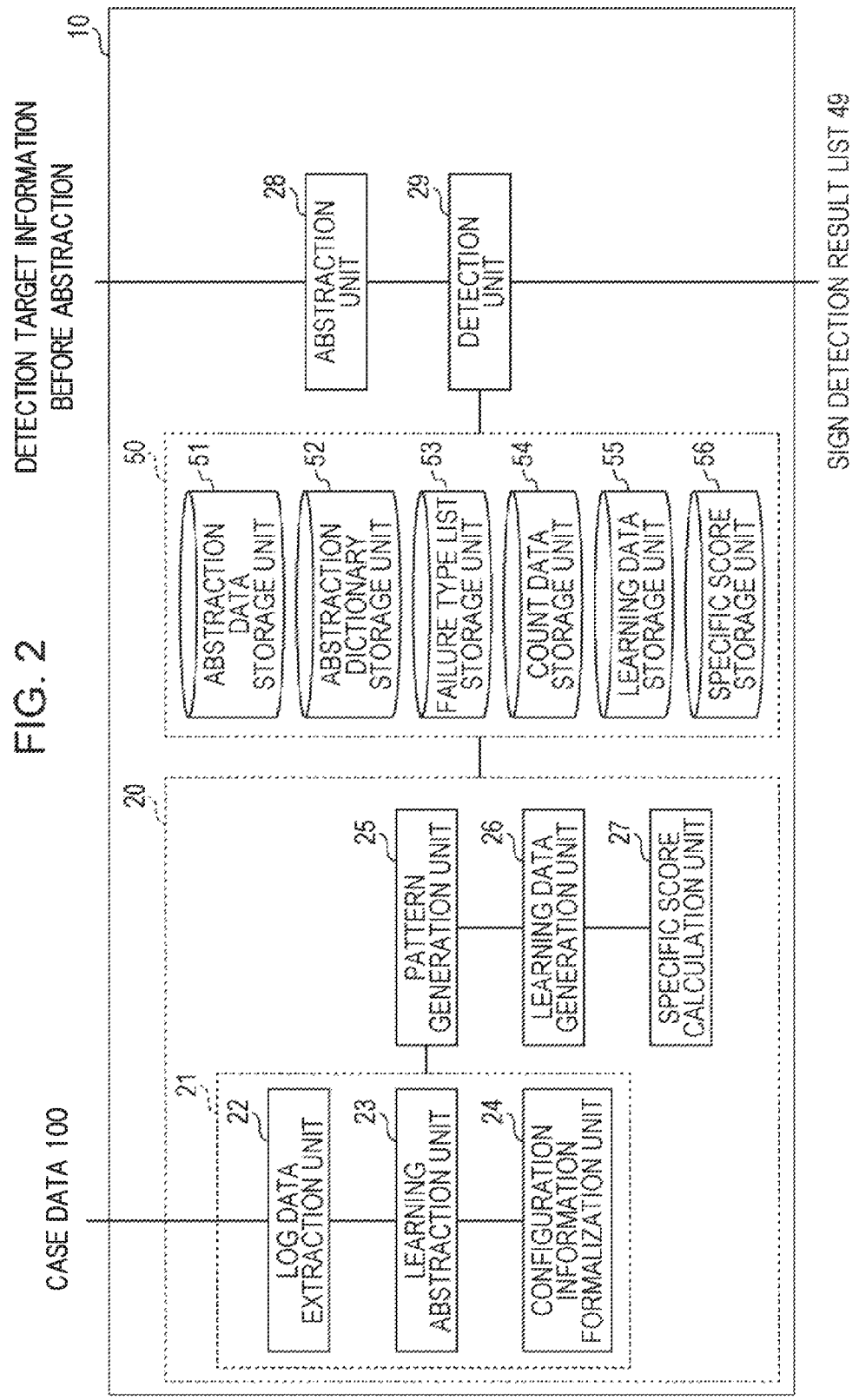
FIG. 2 is a block diagram illustrating an example of a functional configuration of a sign detection device according to the first embodiment.

FIG. 2 illustrates a functional block diagram of the sign detection device 10. As described in FIG. 2, the sign detection device 10 includes a learning unit 20 including a conversion unit 21, a pattern generation unit 25, a learning data generation unit 26, and a specific score calculation unit 27, an abstraction unit 28, and a detection unit 29. In addition, an abstraction data storage unit 51, an abstraction dictionary storage unit 52, a failure type list storage unit 53, a count data storage unit 54, a learning data storage unit 55, and a specific score storage unit 56 are stored in a storage unit 50. Information stored in each storage unit will be described below. The learning unit is an example of a sign pattern generation device of disclosed technology.

Figure 3:
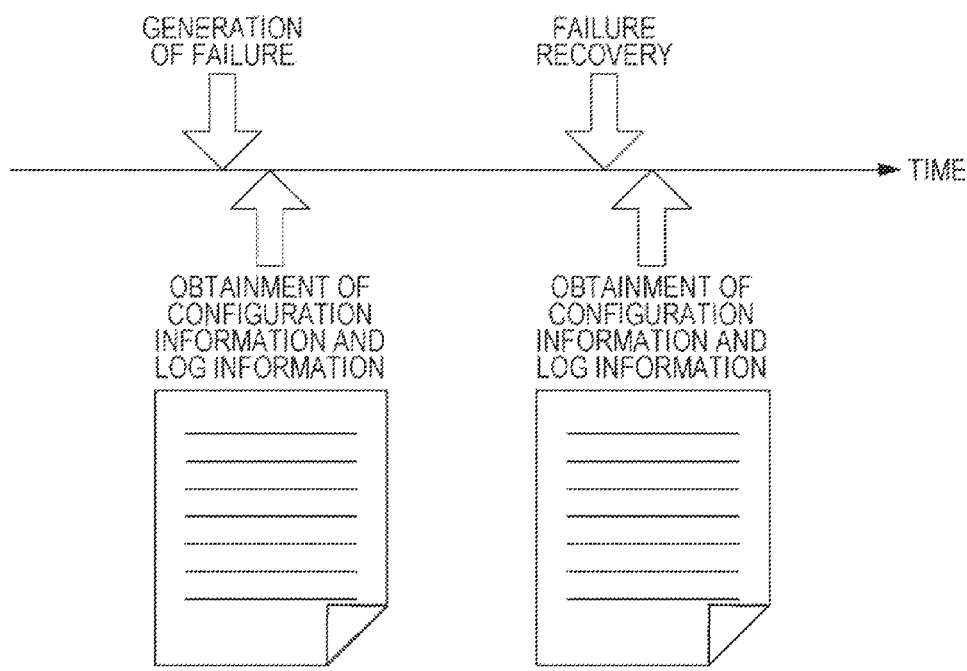
FIG. 3 is a diagram illustrating an example of configuration information and log information collected before and after failure recovery.

Here, as described in FIG. 3, in a case where failure is generated in the processing devices 16, a set of the configuration information and the log information collected before and after failure recovery is input, as case data, to the sign detection device 10 in order to verify a state at the time of the generation of failure. The configuration information is information representing a hardware configuration constituting the processing devices 16 and a software configuration such as an operating system (OS), applications, or the like installed in the processing devices 16. The configuration information, for example, is data of a directory structure in which the configuration information is extracted from a file system of the processing devices 16 by using a well-known dedicated tool of the related art. In addition, in the first embodiment, the configuration information is processed as a group of one or more configuration files obtained at a specific time. In addition, it is assumed that each piece of the configuration information is stored in the configuration file. In addition, before failure recovery is an example of a first time of disclosed technology. In addition, after failure recovery is an example of a second time of disclosed technology.

In addition, the log information is information representing a situation of the processing devices 16. The log information, for example, is data of a directory structure in which the log information is extracted from a file system of the processing devices 16 by using a well-known dedicated tool of the related art. In addition, in the first embodiment, the log information is processed as a group of one or more log files obtained at a specific time. In addition, it is assumed that each of messages representing a situation of the processing devices 16 is stored in the log file for every time stamp representing a time at which a message is output. In addition, the processing device 16 is an example of an information processing device of disclosed technology.

Figure 4:
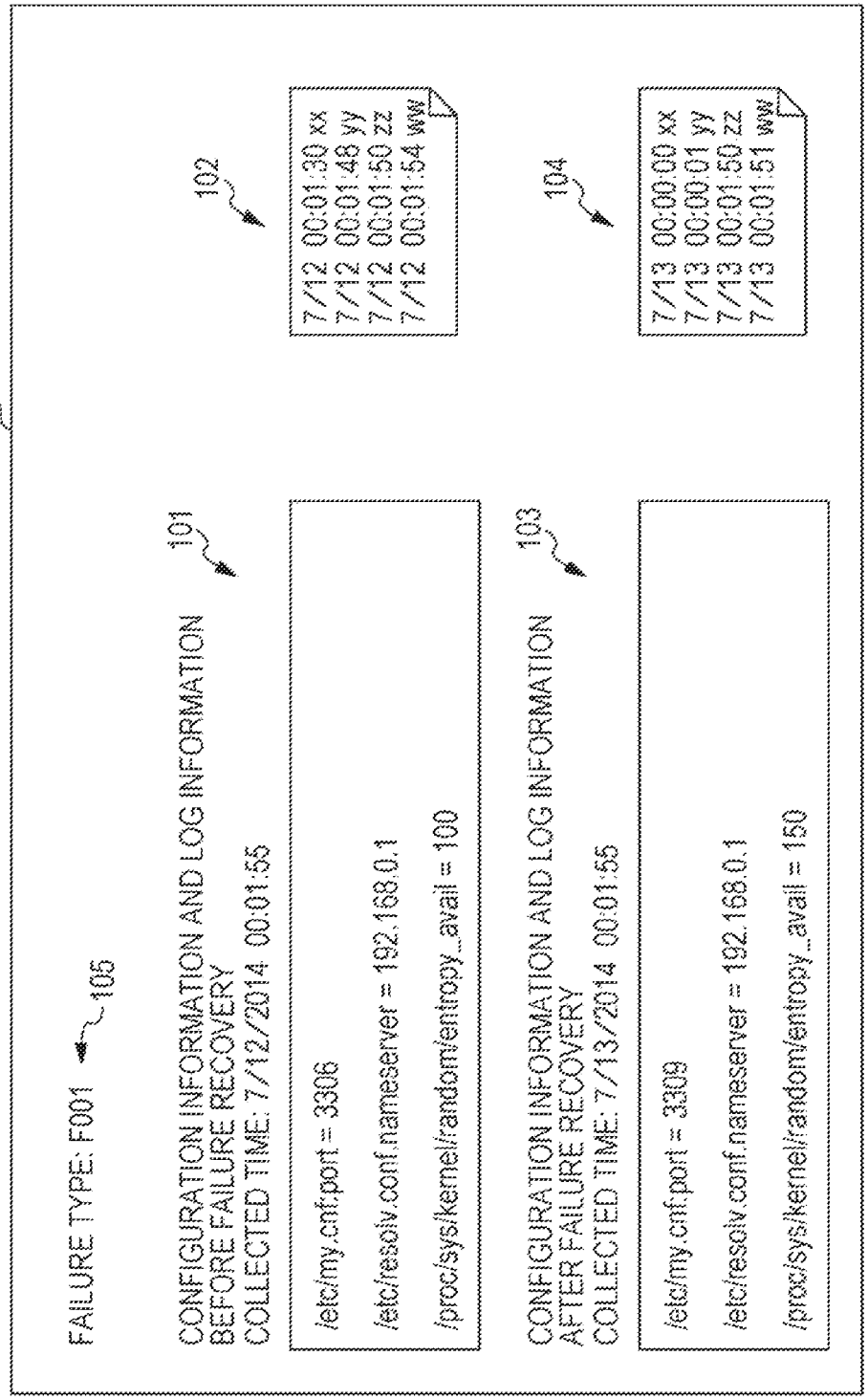
FIG. 4 is a diagram illustrating an example of case data.

FIG. 4 is a diagram illustrating an example of case data 100. In the example of FIG. 4, configuration information 101 and log information 102 collected before failure recovery are recorded along with a time at which the information is collected. In addition, configuration information 103 and log information 104 collected after failure recovery are stored with a time at which the information is collected. Furthermore, a failure type 105 which is identification information determined in advance, is recorded in every failure type. The failure type 105, for example, is recorded in case data 100 by an operator, or the like who collects the configuration information and the log information at the time of failure recovery. The failure type is an example of failure information of disclosed technology.

The conversion unit 21 receives a plurality of case data 100, and stores the case data in a predetermined storage area. In addition, the conversion unit 21 converts each data format of the log information before failure recovery and after failure recovery included in each of the pluralities of case data 100 collected, into a format of the configuration information.

In addition, as illustrated in FIG. 2, the conversion unit 21 includes a log data extraction unit 22, a learning abstraction unit 23, and a configuration information formalization unit 24. Since processing of the conversion unit 21 is performed in each piece of case data 100, description of the log data extraction unit 22, the learning abstraction unit 23, and the configuration information formalization unit 24 will be described as processing, with respect to one piece of case data 100. In addition, in a case of a plurality of the case data 100, the same processing as processing of the log data extraction unit 22, the learning abstraction unit 23, and the configuration information formalization unit 24 described below is repeated. Furthermore, only one log file is stored, as each piece of the log information before and after failure recovery, in the case data 100 that is a processing target. However, in a case of a plurality of log files, the same processing is performed on each of the log files.

In subsequent processing up to a point of time when converted files (details will be described) are generated in the log data extraction unit 22, the learning abstraction unit 23, and the configuration information formalization unit 24, it is assumed that processing is separately performed with respect to the log information before failure recovery and after failure recovery. In the subsequent processing up to when converted files are generated in the log data extraction unit 22, the learning abstraction unit 23, and the configuration information formalization unit 24, only processing with respect to the log information before failure recovery will be described. It is assumed that processing with respect to the log information after failure recovery is similarly performed.

Figure 5:
FIG. 5 is a diagram illustrating an example of a log file list.

The log data extraction unit 22 stores a log file name of each of the log files included in the log information 102 before failure recovery of the received case data 100 in the abstraction data storage unit 51, for example, records in a log file list 118 illustrated in FIG. 5. Here, a column of "id" of the log file list 118 represents a serial number of the number of files recorded, and a column of "file name" represents a log file name including a file path. The log file list 118 exists in every piece of log information to be a processing target.

In addition, the log data extraction unit 22 obtains each of the log files that coincides with a file name of the column of "file name" of the log file list 118 from the log information 102 and extracts window width message information determined in advance with respect to each of the obtained log files.

In addition, the log data extraction unit 22 overwrites the log file so as to exist each of the messages extracted from the log file, with respect to each of the obtained log files.

Figure 6:
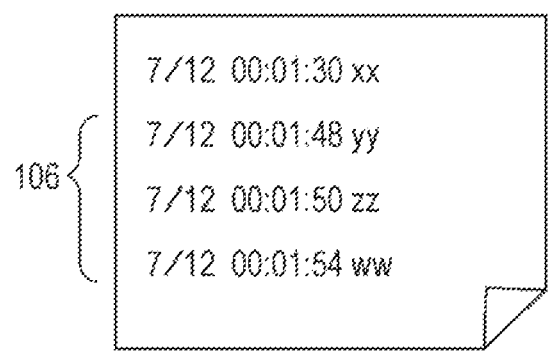
FIG. 6 is a diagram illustrating an example of cutting out a message with a width of a window.

Specifically, the log data extraction unit 22 cuts out a message corresponding to a window width 106 of a time width determined in advance from the most recent message included in the log file, as illustrated in FIG. 6, from the log file to be a processing target. An example in FIG. 6 illustrates a case where the window width 106 is ten seconds. The window width 106 may set a common value with respect to the entirety of the log file, or may set the common value for every failure type. In addition, another value may be set for every case data 100. In addition, a specific window may be determined by multiplying a coefficient of equal to or smaller than one by a time interval between times at which the case data 100 before failure recovery and the case data 100 after failure recovery are collected, and a value that is determined by another method. Starting of the cutting out of the log may use a time at which the log information is obtained, as a starting point of calculation.

The learning abstraction unit 23 processes abstraction according to message dictionary algorithm with respect to each of the log files overwritten in the log data extraction unit 22 in every message included in the log file by using two message dictionaries stored in the abstraction dictionary storage unit 52.

Here, the message dictionary is a dictionary for converting specific messages into character strings. It is assumed that the number of types of character strings that may be classified is different, in one message dictionary and the other message dictionary. In the first embodiment, a message dictionary in which the number of types of the character strings that may be classified is small is defined as a first message dictionary, and a message dictionary in which the number of types of the character strings that may be classified is large is defined as a second message dictionary. The number of types of the character strings is an example of the number of categories of disclosed technology.

Figure 7:
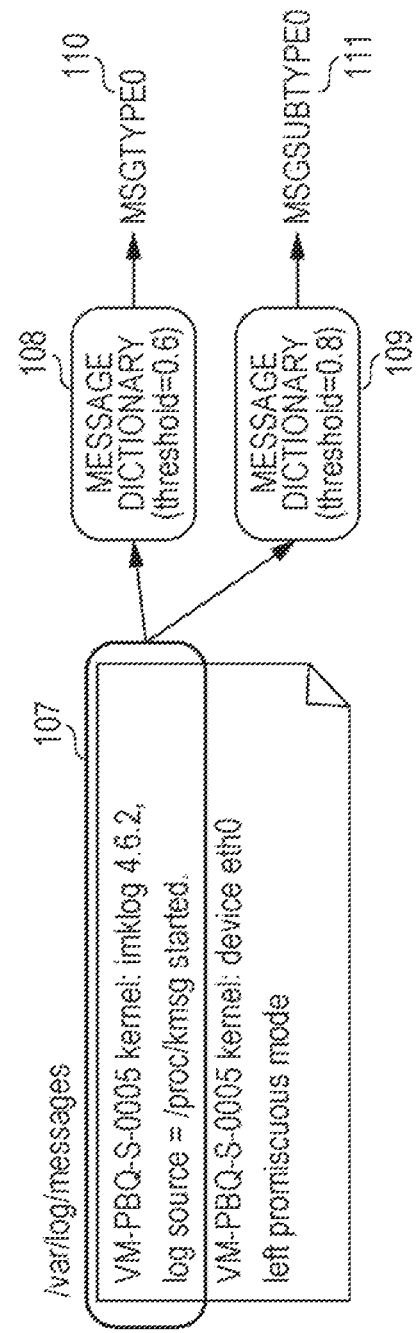
FIG. 7 is a diagram illustrating an example of obtaining two distribution results from messages.

Specifically, the learning abstraction unit 23, as illustrated in FIG. 7, obtains two classification results according to the message dictionary algorithm with respect to each of messages 107 included in the log file to be a processing target by using message dictionaries 108 and 109. In an example of FIG. 7, as a classification result of the message 107, a combination of a classification result 110 based on a first message dictionary 108 and a classification result 111 based on a second message dictionary 109 is obtained. The classification result is an example of abstraction message information of disclosed technology.

In addition, the learning abstraction unit 23 stores each of the combination of the obtained classification result and the log file name (including path of log file) of an obtainment destination, for example, records in the abstraction data storage unit 51 and an abstracted message list 119 illustrated in FIG. 8. Specifically, a file name in which a classification result is obtained is recorded in a column of "file name". A classification result based on the first message dictionary 108 is recorded in a column of "key", and a classification result based on the second message dictionary 109 is recorded in a column of "value", where the both classification results are included in the combination of the classification result. It is assumed that the abstracted message list 119 exists 0 for every piece of log information 102. In addition, information of an "id" column of the abstracted message list 119 represents a serial number of the number of combinations in a classification result and a file name, which are recorded.

Figure 9:
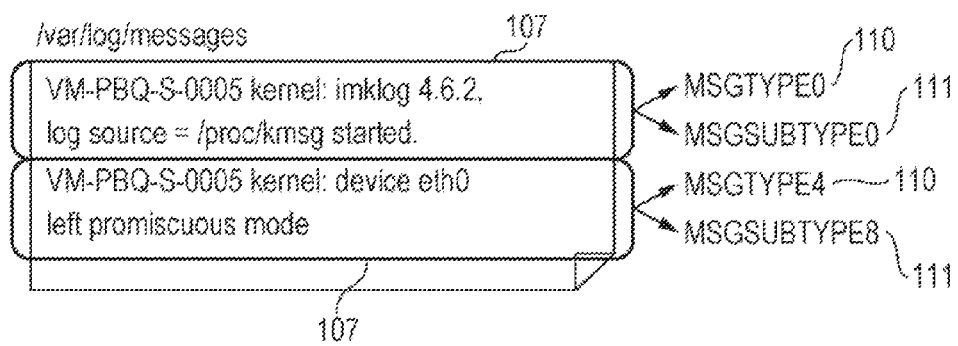
FIG. 9 is a diagram illustrating an example of abstraction.

FIG. 9 illustrates abstraction results of each of messages included in, for example, a log file (/var/log/messages). In a case of an example of FIG. 9, a combination of the classification result 110 "MSGTYPE0" and the classification result 111 "MSGSUBTYPE0" is obtained from the message 107 of "VM-PBQ-S-0005 kernel:imklog 4.6.2,log source=/proc/kmsg started.". In addition, the combination of the classification result 110 "MSGTYPE4" and the classification result 111 "MSGSUBTYPE8" is obtained from the message 107 of "VM-PBQ-S-0005 kernel: device eth0 left promiscuous mode". In the first embodiment, the learning abstraction unit 23 obtains two classification results from one message by applying two pieces of a message dictionary algorithm with different values of parameters and by using the same abstraction technology. Here, the parameter is a value to determine, for example, the number of types of character strings that may be classified, and represents a relationship between input and output.

The configuration information formalization unit 24 converts the data format of a message included in the log file to be a processing target, into the data format of the configuration information based on the log file list 118 and the abstracted message list 119, and generates converted files.

Specifically, the configuration information formalization unit 24 obtains a set of a key and a value corresponding to the log file so as not to overlap (uniquely) with the abstracted message list 119 with respect to each of the log file names recorded in the "file name" of the log file list 118. Here, the corresponding to the log file refers that the "file name" of the abstracted message list 119 corresponds to the log file name.

Figure 10:
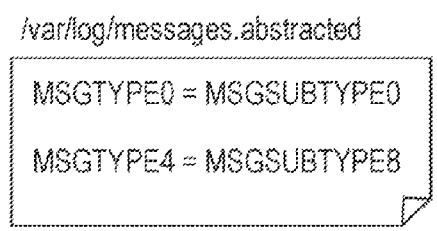
FIG. 10 is a diagram illustrating an example of converted files.

In addition, the configuration information formalization unit 24 newly generates a converted file of a file name in which ".abstracted" is added to a file name of the log file, and each of set of the key and the value for every obtained log file are stored in a configuration of "key=value". FIG. 10 illustrates a specific example of converted files.

Figure 11:
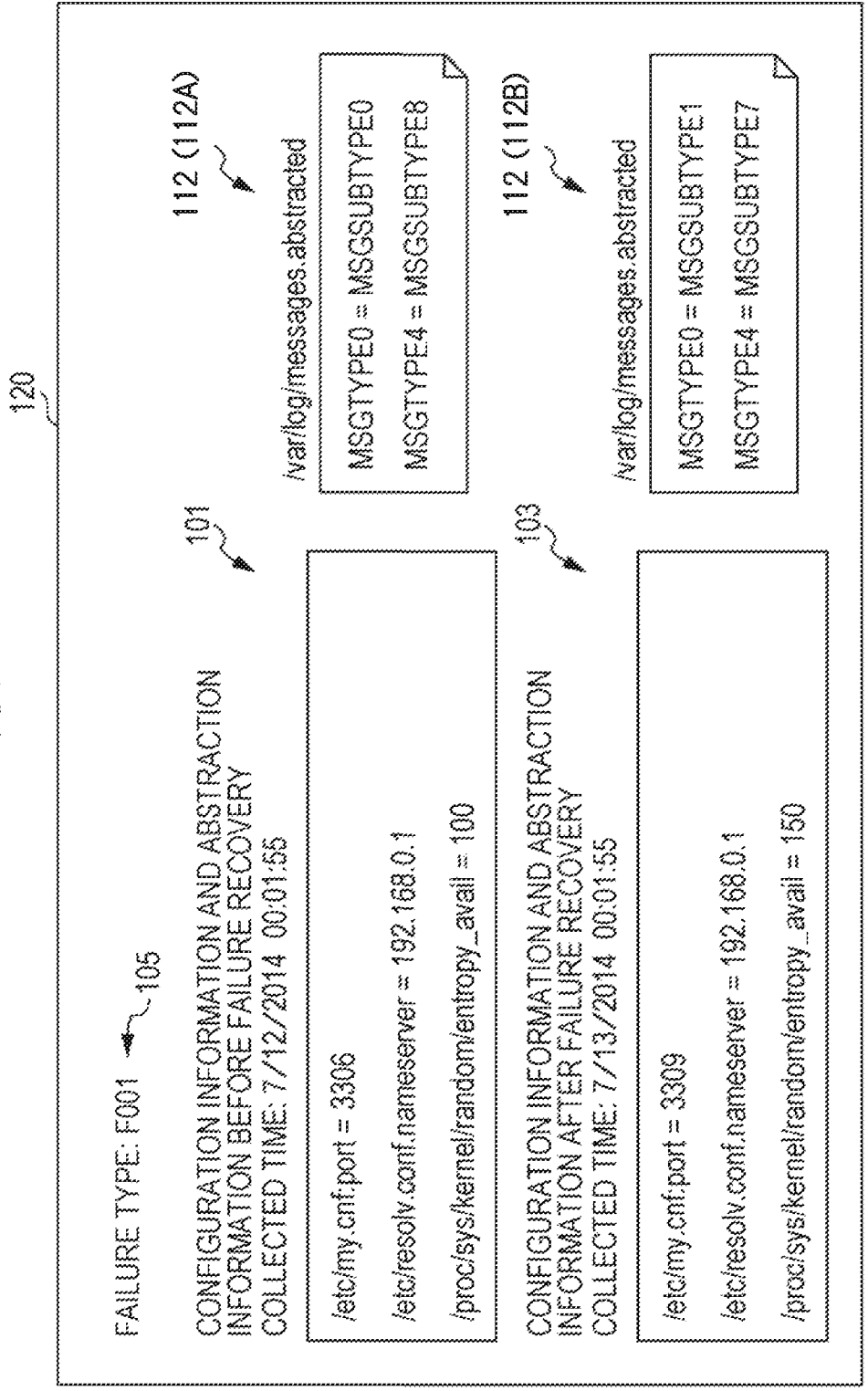
FIG. 11 is a diagram illustrating an example of target case data.

In addition, as illustrated in FIG. 11, the configuration information formalization unit 24 generates each of converted files 112 (112A and 112B) converted from the log information of before failure recovery and after failure recovery and target case data 120 replaced from the log information before failure recovery and after failure recovery, for every piece of case data 100. In addition, the configuration information formalization unit 24 stores the generated target case data 120 in a predetermined storage area.

Figure 12:
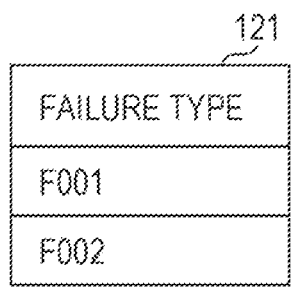
FIG. 12 is a diagram illustrating an example of a failure type list.

The pattern generation unit 25 records the failure type 105 included in each of a plurality of the target case data 120 generated in the configuration information formalization unit 24, for example, in a failure type list 121 included in the failure type list storage unit 53, where the failure type list 121 is illustrated in FIG. 12. A duplicate failure type is not recorded.

In addition, the pattern generation unit 25 extracts all keys of various specified set items relating to a configuration from the configuration information 101 and the converted file 112A before failure recovery, included in each piece of the target case data 120, and the configuration information 103 and the converted file 112B after failure recovery.

For example, as described above, in configuration information of the directory structure, the key is represented by a path from the root directory to a file and a parameter name set in the file. Therefore, the pattern generation unit 25, for example, extracts, as a key, "/etc/my.cnf:port" from description "/etc/my.cnf:port=3306" of the first line of the configuration information 101 before failure recovery of the target case data 120 in FIG. 11. Meanwhile, a key of the converted file 112 is extracted from information stored in the converted file 112 and a file name of the converted file 112. Specifically, the key is extracted as "converted file name"+":"+"left section of each line". For example, in the first line of the converted file 112A of FIG. 11, "/var/log/messages.abstracted: MSGTYPE0" is extracted as the key.

Figure 13:
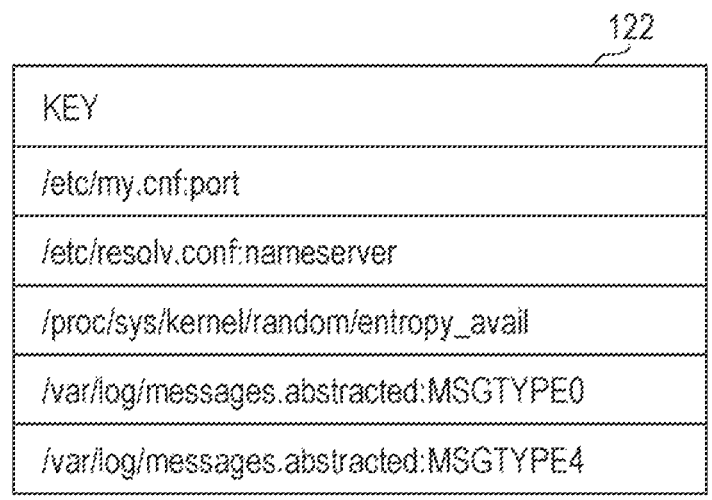
FIG. 13 is a diagram illustrating an example of a key list.

In addition, the pattern generation unit 25 lists each of the extracted keys, and creates, for example, a key list 122 as illustrated in FIG. 13. Here, a column of "key" of the key list 122 represents a key that has recorded.

In addition, the pattern generation unit 25 generates a pattern corresponding to each of a failure type, a key, and values before and after failure recovery, in a case where the key values are different before and after failure recovery, among keys recorded in the key list 122.

For example, in the target case data 120 of FIG. 11, a value "3306" before failure recovery and a value "3309" after failure recovery are different in key "/etc/my.cnf:port". Therefore, the pattern generation unit 25 generates a pattern corresponding to a failure type "F001", the key "/etc/my.cnf:port", the value "3306" before failure recovery, and the value "3309" after failure recovery. In addition, in the target case data 120 of FIG. 11, a value "MSGSUBTYPE0" before failure recovery and a value "MSGSUBTYPE1" after failure recovery are different in key "/var/log/messages.abstracted: MSGTYPE0". Therefore, the pattern generation unit 25 generates a pattern corresponding to a failure type "F001", the key "/var/log/messages.abstracted: MSGTYPE0", the value "MSGSUBTYPE0" before failure recovery, and the value "MSGSUBTYPE1" after failure recovery.

In addition, the pattern generation unit 25 records each of the generated pattern, for example, in a pattern list 123 illustrated in FIG. 14. Here, it is assumed that a value before failure recovery is recorded in a column of a "value $V_A$" of the pattern list 123, and a value after failure recovery is recorded in a column of a "value $V_B$".

The learning data generation unit 26 generates learning data from each pattern recorded in the pattern list 123 generated in the pattern generation unit 25. The learning data generation unit 26 aggregates, for every failure type, the number of times that a value occurs as the correct answer and the number of times that a value occurs as an error, with respect to a key to generate data as the learning data. A pattern recorded in the pattern list 123 includes values before and after failure recovery with respect to each key, a value $V_A$ before failure recovery is a value of an error, and a value $V_B$ after failure recovery is a value of the correct answer.

For example, as illustrated in FIG. 15, a learning data list 124 in which a plurality of learning data including items of failure types, keys, correctness, values, and the number of times is recorded is stored in the learning data storage unit 55. The learning data generation unit 26 increases the number of times of the learning data of which the correctness is "Failure" by one with respect to one pattern, in the learning data in which a failure type, a key, and a value $V_A$ before failure recovery of a certain pattern coincide with a failure type, a key, and a value of the learning data. In addition, the learning data generation unit 26 increases the number of times of the learning data of which the correctness is "Success" by one with respect to one pattern, in the learning data in which a failure type, a key, and a value $V_B$ after failure recovery of a certain pattern coincide with a failure type, a key, and a value of the learning data. In a case where the learning data in which a failure type, a key, and a value before failure recovery $V_A$ or a value after failure recovery $V_B$ coincide with the pattern is not registered in the learning data list 124, the learning data generation unit 26 adds the learning data in the list and sets one in the number of times.

In addition, the learning data generation unit 26, for example, as illustrated in FIG. 16, stores the number of pieces of the learning data in which the correctness is "Success" and the number of times $N_S$ counted for every failure type and key in a count data list 125 stored in the count data storage unit 54. Similarly, the learning data generation unit 26 stores the number of the learning data in which the correctness is "Failure" and the number of times $N_F$ counted for every failure type and key in the count data list 125. It is assumed that information recorded in the count data list 125 is count data. In addition, the learning data is an example of a predetermined pattern of disclosed technology and a pattern to sign failure.

When the sign of the generation of failure is detected from the configuration information and the log information that are newly input, the specific score calculation unit 27 calculates a specific score for determining whether the learning data having a value of the correct answer or the learning data having an error value is used. The specific score, as a value with respect to a certain key, represents the value to which correctness or error is significantly high, as probability having the same value is high, that is, as change in a value for a certain key is low. The specific score calculation unit 27 performs processing for the entirety of the failure types stored in the failure type list 121.

For example, the specific score calculation unit 27 obtains an empirical probability where each value of the learning data in which the correctness is "Success" occurs with respect to a certain key of a certain failure type in the learning data list 124. Then, the specific score calculation unit 27 calculates conditional entropy from the obtained probability, and the calculated conditional entropy becomes a correct answer specific score $S_S$ representing probability of the occurrence of the learning data in which the correctness is "Success". Similarly, the specific score calculation unit 27 calculates conditional entropy from empirical probability where each value of the learning data in which the correctness is "Failure" occurs, and the calculated conditional entropy becomes a correct answer specific score $S_F$ representing probability of the occurrence of the learning data in which the correctness is "Failure". The specific score $S_S$ is represented in the following Equation (1) and the specific score $S_F$ is represented in the following Equation (2). $X_{Success}$ is a set of the learning data in which the correctness is "Success", and $X_{Failure}$ is a set of the learning data in which the correctness is "Failure", with respect to a certain key of a certain failure type.

$$S_S \triangleq \sum_{x \in X_{Success}} -p(x|\text{Success})\log p(x|\text{Success}) \quad (1)$$

$$S_F \triangleq \sum_{x \in X_{Failure}} -p(x|\text{Failure})\log p(x|\text{Failure}) \quad (2)$$

More specifically, an example for calculating the specific score $S_S$ and the specific score $S_F$ with respect to a failure type "F001" and a key "/etc/my.cnf:port" will be described, by using the learning data list 124 illustrated in FIG. 15 and the count data list 125 illustrated in FIG. 16. In this case, the $X_{Success}$ and the $X_{Failure}$ are as follows.

$X_{Success}$={3309}
$X_{Failure}$={3306, 3307, 3308}

Each piece of the learning data included in the above set is represented by a value that is contained within the learning data.

The specific score calculation unit 27 obtains the number of times (three times) of the occurrence of the learning data of value being "3309" included in the $X_{Success}$ from the learning data list 124. Similarly, the specific score calculation unit 27 obtains the number of times (one time for each) of the occurrence in each of the learning data of value being "3306", value "3307", and value "3308" included in the $X_{Failure}$ from the learning data list 124. In addition, the specific score calculation unit 27 obtains the number of times $N_S$ (three times) of the occurrence in the learning data of correctness being "Success" of a failure type "F001" and a key "/etc/my.cnf:port" from the count data list 125. In addition, the specific score calculation unit 27 obtains the number of times $N_F$ (three times) of the occurrence in the learning data of correctness being "Failure".

The specific score calculation unit 27 calculates empirical probability with respect to each value of the learning data by using the obtained number of times, as illustrated below.

P (3306|Failure)=1/3
P (3307|Failure)=1/3
P (3308|Failure)=1/3
P (3309|Success)=3/3

The specific score calculation unit 27 calculates the specific score $S_S$ and the specific score $S_F$ as follows by using the calculated empirical probability and the above Equation (1) and Equation (2).

$$S_S = -\frac{3}{3}\log\frac{3}{3} = 0,$$

$$S_F = -3 \times \frac{1}{3}\log\frac{1}{3} \approx 0.48$$

The specific score calculation unit 27 calculates the specific score $S_S$ and the specific score $S_F$ for every failure type and for every key, for example, and the calculated result is recorded in a specific score list 126 illustrated in FIG. 17 which is stored in the specific score storage unit 56.

In a case where the configuration information and the log information, which is a target of sign detection as detection target information before abstraction, are input, the abstraction unit 28 converts the data format of the log information into the data format of the configuration information. Specifically, the abstraction unit 28 performs the same processing as the conversion unit 21 on the log information that has input and generates the converted file 112. In addition, the abstraction unit 28 outputs to the detection unit 29 detection target information in which the configuration information that has input and the converted file 112 are combined. Since processing of the abstraction unit 28 other than the above is similar to the processing of the conversion unit 21, a detailed description will not be repeated. In addition, the abstraction unit 28 may store the generated detection target information in the storage unit 50. In this case, the detection unit 29 described below obtains detection target information from the storage unit 50, and performs processing of the detection unit 29.

In a case where the detection target information is input from the abstraction unit 28, the detection unit 29 detects the sign of the generation of failure by using the learning data list 124, the count data list 125, and the specific score list 126 which are obtained from the storage unit 50.

Specifically, the detection unit 29 performs comparison of detection target data represented by a key and a set of values included in the detection target information and the learning data, and determines whether or not values of each set item are accurately set in the configuration information at a timing at which the log information is output. Here, a set of the key and value with respect to the converted file 112 included in the detection target information is assumed as the key is "converted file name"+":"+"left section of specific line of converted file" and the value is "right section of specific line of converted file".

In a case where it is determined that a correct value is not set, the detection unit 29 detects the sign of the generation of failure, and outputs a sign detection result. A set including a key that does not exist in the column of a "key" of the learning data list 124 is excluded from a processing target.

As described above, in the first embodiment, usage of any one of correct learning data and erroneous learning data is specified and the sign detection is performed. Specifically, the detection unit 29 obtains the specific score $S_S$ and the specific score $S_F$ corresponding to a key coinciding with a key included in the detection target data from the specific score list 126, for every failure type. The specific score $S_S$ defined by the above Equation (1) represents that the probability that a value of the correct learning data is a correct answer increases, as the value decreases. In addition, the specific score $S_F$ defined by the above Equation (2) represents that probability in which a value of the erroneous learning data is an error is high, as the value is small. Therefore, the detection unit 29 specifies the correct learning data with respect to a failure type in which the specific score $S_S$ is smaller than the specific score $S_F$, and specifies the erroneous learning data with respect to a failure type in which the specific score $S_F$ is smaller than the specific score $S_S$.

The detection unit 29 compares the detection target data and the correct learning data with respect to a failure type in which the correct learning data is specified, and detects the sign of the generation of failure in a case where the detection target data does not coincide with the correct learning data. In the first embodiment, since the log information is converted into the data format of the configuration information and learning of the data is performed at the same time in a common format, it is assumed that data relating to the configuration information and the log information become necessarily combined with the correct learning data and the erroneous learning data.

In addition, the detection unit 29 compares the detection target data and the erroneous learning data with respect to a failure type in which the erroneous learning data is specified, and detects the sign of the generation of failure in a case where the detection target data coincides with the erroneous learning data. In a case where the sign of the generation of failure is detected, the detection unit 29 stores a sign detection result in which the failure type and the detection target data (key and value) are associated with the detection score (details will be described), for example, in a sign detection result list 127 as illustrated in FIG. 18. Here, the sign detection result list 127 will be described. In the first embodiment, the log information is converted into the data format of the configuration information and the erroneous learning data learn at the same time in a common format. Therefore, in the sign detection result list 127, as illustrated in FIG. 18, a set of a key relating to the configuration information which is at least equal to or greater than one, and a key converted by the log information which is at least equal to or greater than one, exist. The sign detection result is an example of the sign of failure of disclosed technology.

The detection score is a score representing probability of the sign detection result. For example, it is assumed that a plurality of erroneous learning data having a key coinciding with a key of the detection target data exists, and a value of the detection target data coincides with one of the erroneous learning data, with respect to a certain failure type. In this case, accuracy of probability that a value is error is improved, as the number of times of the occurrence of the erroneous learning data coinciding with a value of the detection target data, is large. Therefore, the detection unit 29, for example, may set a detection score as a value caused by that the number of times of the occurrence N of the erroneous learning data coinciding with a value of the detection target data is divided by the number of times of the occurrence $N_F$ of the erroneous learning data of same failure type and key. The number of times of occurrences N may be obtained from the learning data list 124. The number of times of occurrences $N_F$ may be obtained from the count data list 125. Here, when the detection score illustrated in FIG. 18 is described, a score of the configuration information in the first line is 0.75 and a score for conversion of the log information in the second line is 1.00. Therefore, the sign detection result may reliably represent that the configuration information in the first line is erroneous in a situation in which a system represents a key and a value in the second line.

In addition, it is difficult to calculate the detection score based on the number of times of occurrence, as described above, in a case where a value of the correct learning data having a key that coincides with a key of the detection target data, does not coincide with a key of the detection target data for a certain failure type. Therefore, the detection unit 29 processes, as the detection score, a value (for example, "−1") representing that a value does not coincide with the correct learning data, unlike the detection score based on the number of times of occurrence.

The log file list 118 and the abstracted message list 119 are stored in the abstraction data storage unit 51.

The message dictionary 108 and the message dictionary 109 are stored in the abstraction dictionary storage unit 52.

The failure type list 121 is stored in the failure type list storage unit 53.

The count data list 125 is stored in the count data storage unit 54.

The key list 122 and the learning data list 124 are stored in the learning data storage unit 55.

The specific score list 126 is stored in the specific score storage unit 56.

Figure 19:
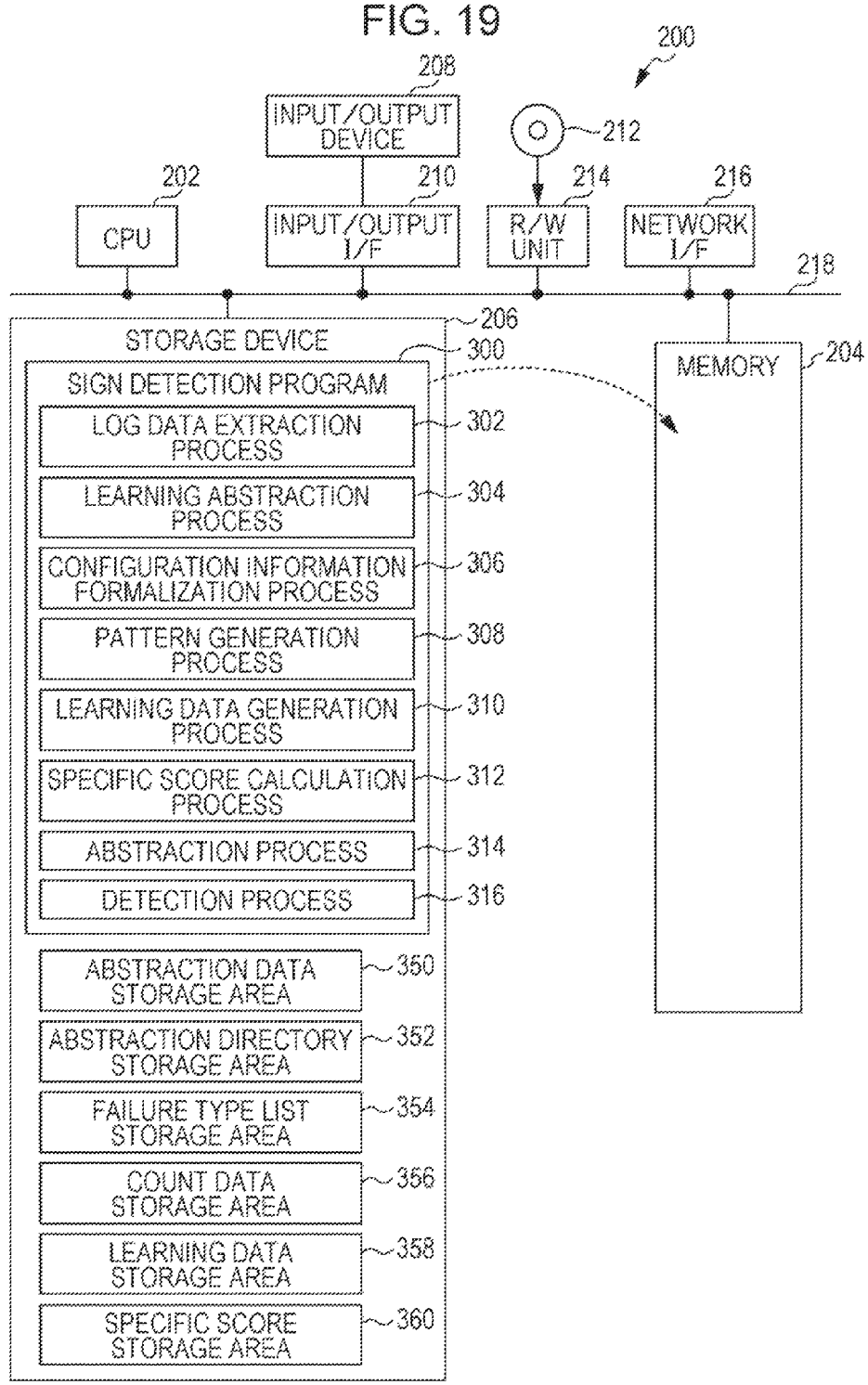
FIG. 19 is a block diagram illustrating a schematic configuration of a computer that functions as the sign detection device according to the first embodiment.

The sign detection device 10, for example, may be realized in a computer 200 illustrated in FIG. 19. The computer 200 includes a CPU 202, a memory 204 as a temporary storage area, and a non-volatile storage device 206. In addition, the computer 200 includes an input/output interface (I/F) 210 connected with an input/output device 208. In addition, the computer 200 includes a read/write (R/W) unit 214 that controls reading and writing of data with respect to a recording medium 212, and a network I/F 216 connected to a network 12 such as the Internet. The CPU 202, the memory 204, the storage device 206, the input/output I/F 210, the R/W unit 214, and the network I/F 216 are connected with each other through a bus 218.

The storage device 206 is realized by a hard disk drive (HDD), a solid state drive (SSD), a flash memory, or the like. A sign detection program 300 for causing the computer 200 to function as the sign detection device 10 is stored in the storage device 206 as the recording medium. In addition, the storage device 206 includes an abstraction data storage area 350 on which the log file list 118 and the abstracted message list 119 are stored and an abstraction directory storage area 352 on which the message dictionaries 108 and 109 are stored. In addition, the storage device 206 includes a failure type list storage area 354 on which the failure type list 121 is stored, and a count data storage area on which the count data list 125 is stored. In addition, the storage device 206 further includes the learning data storage area on which the key list 122 and the learning data list 124 are stored, and a specific score storage area 360 on which the specific score list 126 is stored.

The CPU 202 reads the sign detection program 300 from the storage device 206, stores the program in the memory 204, and sequentially executes process of the sign detection program 300. In addition, the CPU 202 reads the log file list 118 and the abstracted message list 119 stored in the abstraction data storage area 350, and stores the log file list 118 and the abstracted message list 119 in the memory 204. In addition, the CPU 202 reads the message dictionaries 108 and 109 stored in the abstraction directory storage area 352, and stores the message dictionaries 108 and 109 in the memory 204. In addition, the CPU 202 reads the failure type list 121 stored in the failure type list storage area 354, and stores the failure type list 121 in the memory 204. In addition, the CPU 202 reads the count data list 125 stored in the count data storage area 356, and stores the count data list 125 in the memory 204. In addition, the CPU 202 reads the key list 122 and the learning data list 124 stored in a learning data storage area 358, and stores the key list 122 and the learning data list 124 in the memory 204. In addition, the CPU 202 reads the specific score list 126 stored in a specific score storage area 360, and stores the specific score list 126 in the memory 204.

The sign detection program 300 includes a log data extraction process 302, a learning abstraction process 304, a configuration information formalization process 306, a pattern generation process 308, and a learning data generation process 310. In addition, the sign detection program 300 further includes a specific score calculation process 312, an abstraction process 314, and a detection process 316.

The CPU 202 is operated as the log data extraction unit 22 illustrated in FIG. 2 by performing the log data extraction process 302. In addition, the CPU 202 is operated as the learning abstraction unit 23 illustrated in FIG. 2 by performing the learning abstraction process 304. In addition, the CPU 202 is operated as the configuration information formalization unit 24 illustrated in FIG. 2 by performing the configuration information formalization process 306. In addition, the CPU 202 is operated as the pattern generation unit 25 illustrated in FIG. 2 by performing the pattern generation process 308. In addition, the CPU 202 is operated as the learning data generation unit 26 illustrated in FIG. 2 by performing the learning data generation process 310. In addition, the CPU 202 is operated as the specific score calculation unit 27 illustrated in FIG. 2 by performing the specific score calculation process 312. In addition, the CPU 202 is operated as the abstraction unit 28 illustrated in FIG. 2 by performing the abstraction process 314. In addition, the CPU 202 is operated as the detection unit 29 illustrated in FIG. 2 by performing the detection process 316. With this, the computer 200 in which the sign detection program 300 is executed functions as the sign detection device 10.

The sign detection device 10 may be implemented, for example, by a semiconductor integrated circuit, more specifically, an application specific integrated circuit (ASIC), or the like.

Figure 20:
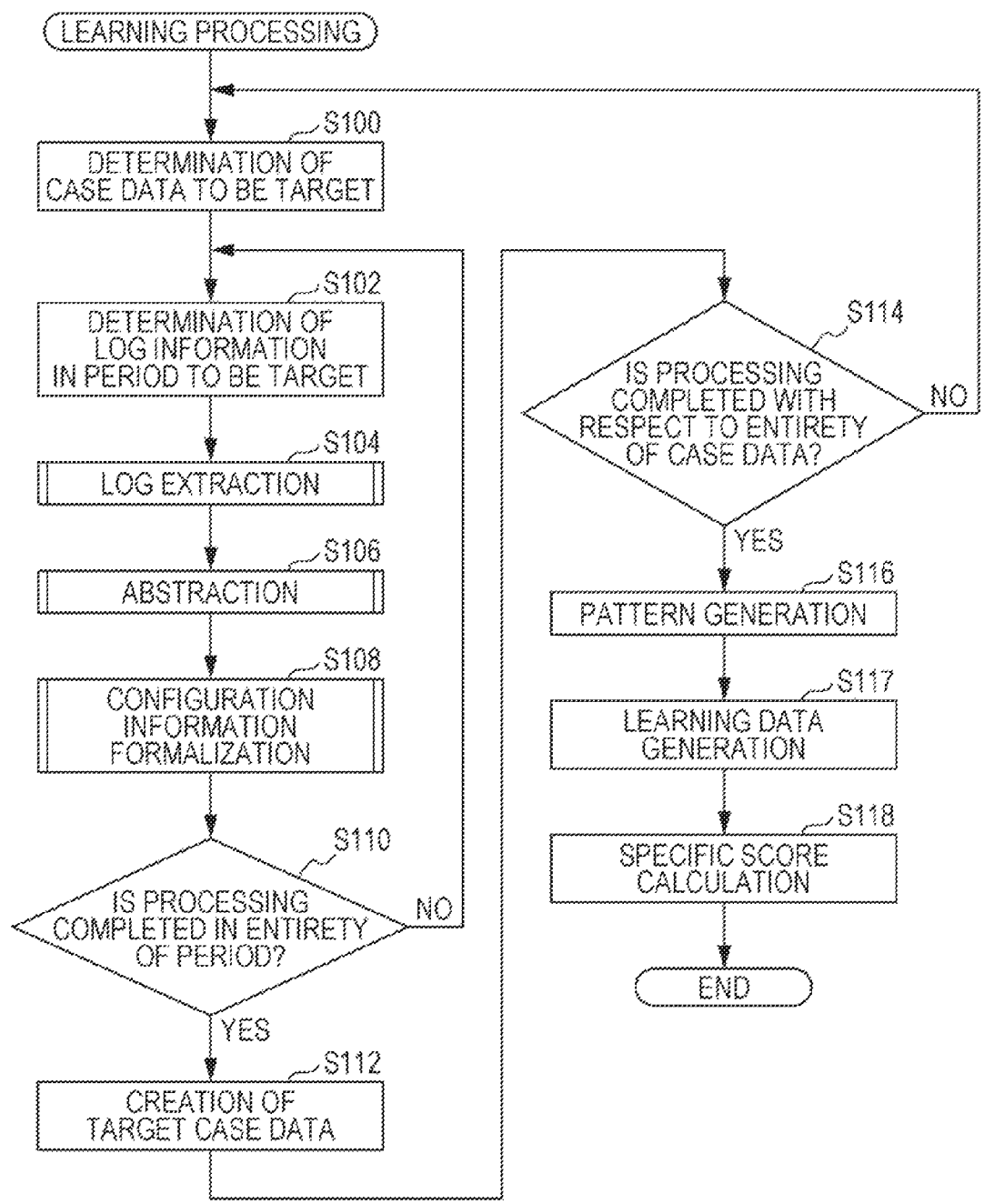
FIG. 20 is a flow chart illustrating an example of learning processing according to the first embodiment.
Figure 21:
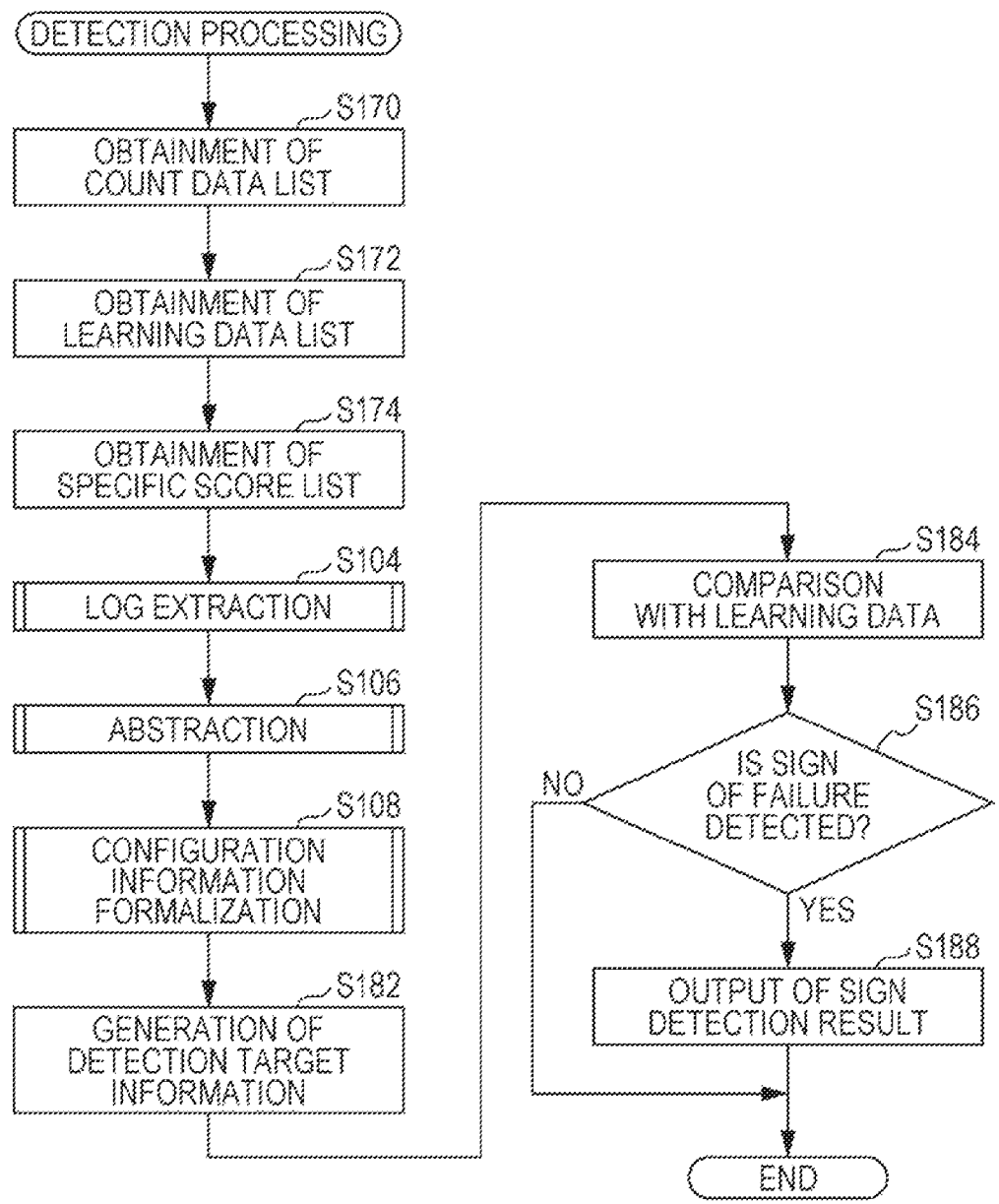
FIG. 21 is a flow chart illustrating an example of detection processing according to the first embodiment.

Next, operation of the sign detection device 10 according to the embodiment will be described. First, when a plurality of the case data 100 is input to the sign detection device 10, learning processing illustrated in FIG. 20 is performed in the sign detection device 10, and the log file list 118, the abstracted message list 119, and the learning data list 124 are stored in the storage unit 50. In addition, the count data list 125 and the specific score list 126 are stored in the storage unit 50. In this state, when the configuration information and the log information of a detection target are input to the sign detection device 10, detection processing illustrated in FIG. 21 is performed in the sign detection device 10, and the sign detection result list 127 is output from the sign detection device 10. The learning processing and the detection processing performed by the sign detection device 10 are examples of a sign pattern generation method and a sign detection method of disclosed technology. Hereinafter, each processing will be described in detail.

In step S100 of the learning processing illustrated in FIG. 20, the log data extraction unit 22 determines the case data 100 to be a processing target from each piece of the received case data 100.

Next, in step S102, the log data extraction unit 22 determines log information in a period (before failure recovery or after failure recovery) to be a processing target among the case data 100 of a processing target.

Figure 22:
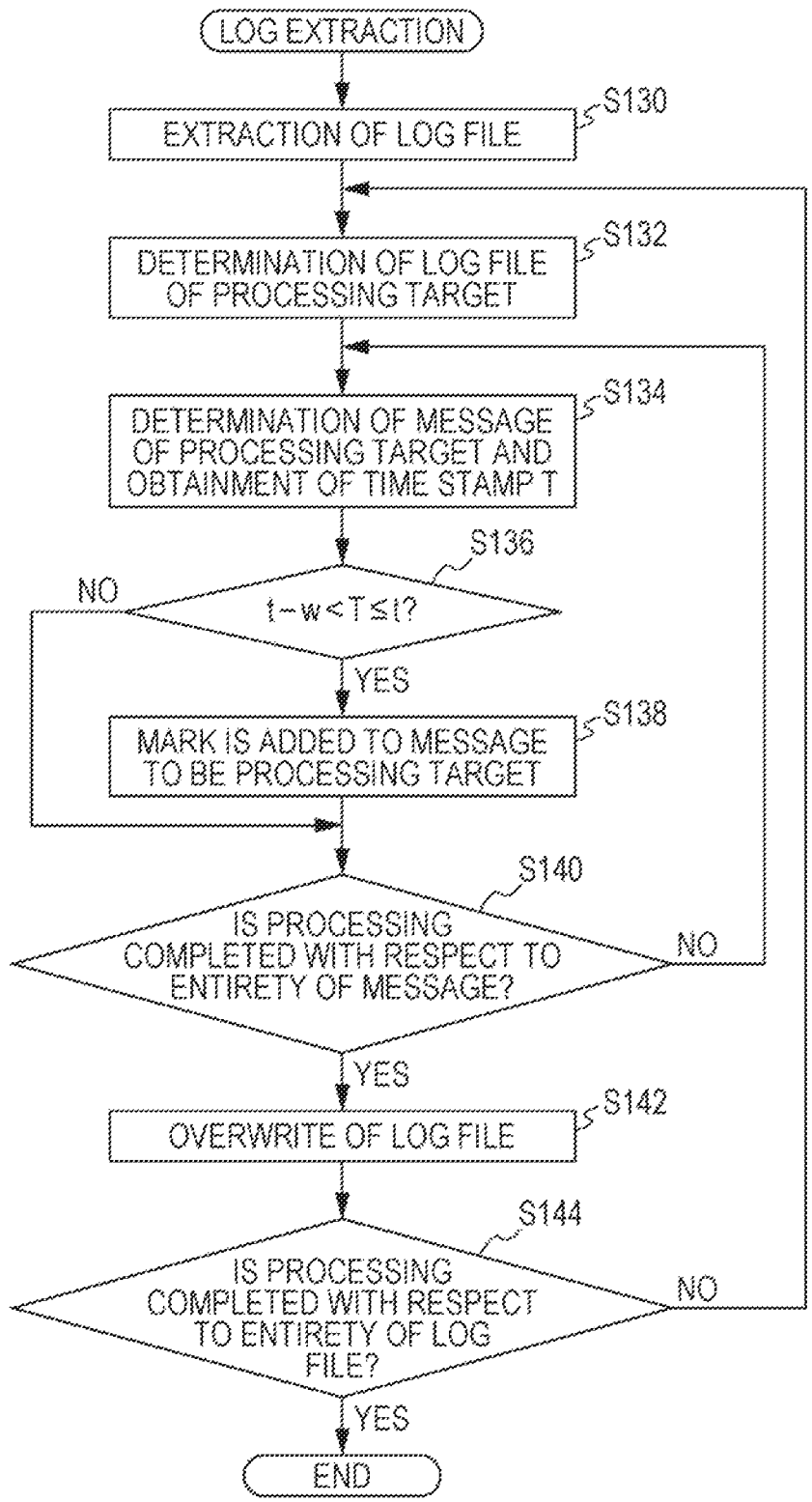
FIG. 22 is a flow chart illustrating an example of log extraction processing according to the first embodiment.

Next, in step S104, the log data extraction unit 22 performs log extraction processing illustrated in FIG. 22 in detail with respect to the log information to be a processing target.

In step S130 of the log extraction processing illustrated in FIG. 22, the log data extraction unit 22 extracts each of the log files included in the log information to be a processing target, and records each of the log file names in the log file list 118.

Next, in step S132, the log data extraction unit 22 determines a log file to be a processing target from the log file included in the log file list 118.

Next, in step S134, the log data extraction unit 22 obtains a message to be a processing target and a time stamp T of the message from the log file determined as a processing target in step S132.

Next, in step S136, the log data extraction unit 22 determines whether or not the time stamp T obtained in step S134 corresponds to a period which is defined as a time interval between a time represented by t−w and the time t, where the time t corresponds to an obtainment time of the log information of a processing target and w corresponds to a window width (time). In a case where the log data extraction unit 22 determines that the obtained time stamp T corresponds to the period described above, the log extraction processing proceeds to step S138. Meanwhile, in a case where the log data extraction unit 22 determines that the obtained time stamp T does not correspond to the period described above, the log extraction processing proceeds to step S140.

Next, in step S138, the log data extraction unit 22 adds a mark to a message to be a processing target.

Next, in step S140, the log data extraction unit 22 determines whether or not processing of step S136 or step S136 and step S138 is completed with respect to entirety of the messages included in the log file to be a processing target. In a case where the log data extraction unit 22 determines that the processing of step S136 or step S136 and step S138 is completed with respect to the entirety of the message included in the log file to be a processing target, the log extraction processing proceeds to step S142. Meanwhile, in a case where the log data extraction unit 22 determines that the processing of step S136 or step S136 and step S138 are not completed with respect to the entirety of message included in the log file to be a processing target, the log extraction processing proceeds to step S134. Therefore, the log data extraction unit 22 changes a message to be a processing target, and repeats processing of step S136 to step S140.

Next, in step S142, the log data extraction unit 22 erases each of messages to which the mark obtained in step S138 and included in the log file to be a processing target are not added, and overwrites the log file to be a processing target.

Next, in step S144, the log data extraction unit 22 determines whether or not processing of step S134 to step S142 is completed with respect to the entirety of the log file included in the log file list 118 obtained in step S130. In a case where the log data extraction unit 22 determines that the processing of step S134 to step S142 is completed with respect to the entirety of the log file included in the log file list 118, the log extraction processing is completed. Meanwhile, in a case where the log data extraction unit 22 determines that the processing of step S134 to step S142 is not completed with respect to the entirety of the log file included in the log file list 118, the log extraction processing proceeds to step S132. Therefore, the log data extraction unit 22 changes a log file to be a processing target, and repeats processing of step S134 to step S144.

Figure 23:
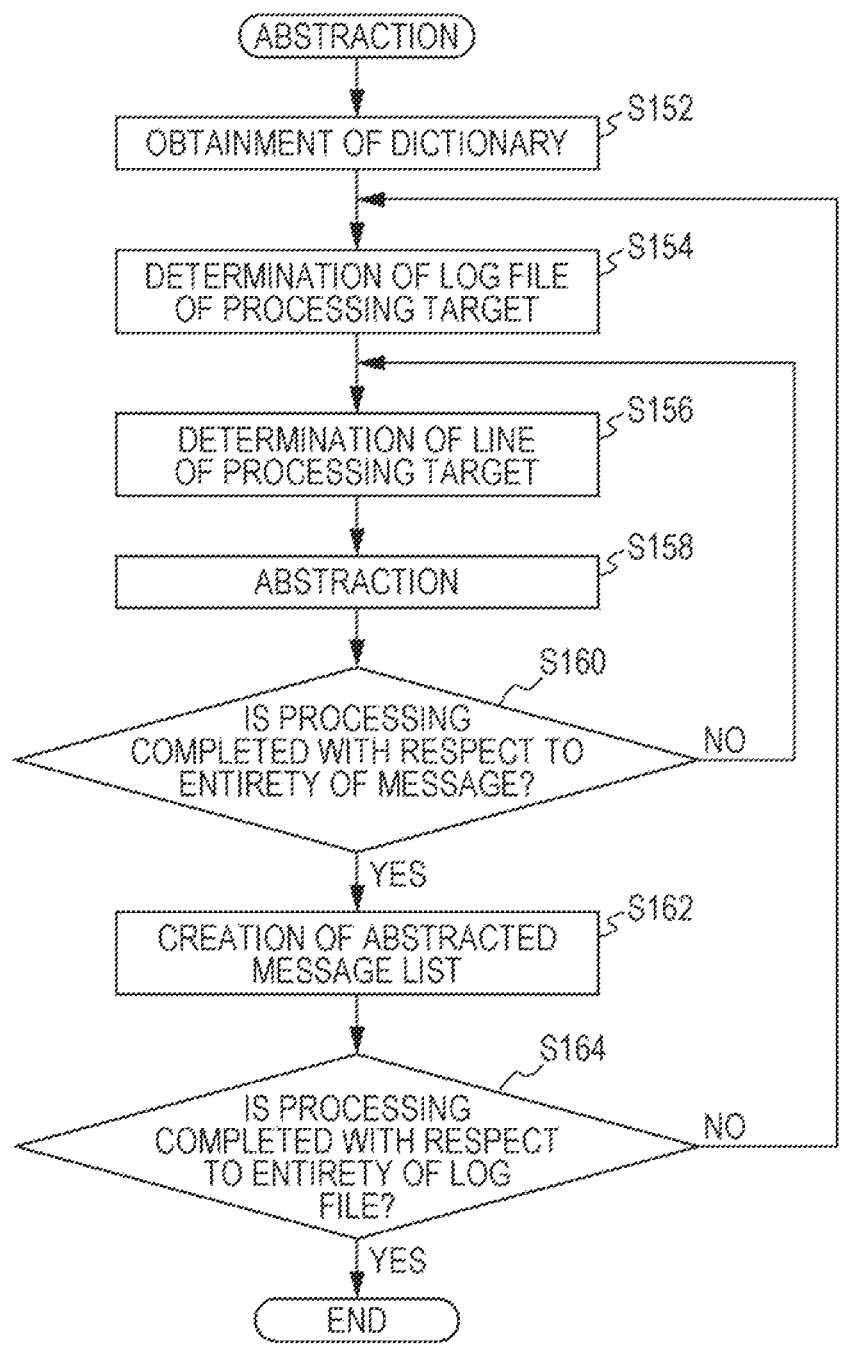
FIG. 23 is a flow chart illustrating an example of abstraction processing according to the first embodiment.

Next, in step S106 of learning processing illustrated in FIG. 20, the learning abstraction unit 23 performs abstraction processing illustrated in detail in FIG. 23.

In step S152 of abstraction processing illustrated in FIG. 23, the learning abstraction unit 23 obtains the first message dictionary 108 and the second message dictionary 109 stored in the abstraction dictionary storage unit 52.

Next, in step S154, the learning abstraction unit 23 determines a log file to be a processing target from the log file included in the log file list 118 obtained in step S104.

Next, in step S156, the learning abstraction unit 23 determines a message to be a processing target from the log file to be a processing target. In the first embodiment, one line included in the log file is processed as one message.

Next, in step S158, the learning abstraction unit 23 obtains a combination of classification results according to message dictionary algorithm by using the first message dictionary 108 and the second message dictionary 109 obtained in step S152.

Next, in step S160, the learning abstraction unit 23 determines whether or not processing of step S158 is completed with respect to the entirety of messages included in the log file to be a processing target. In a case where it is determined that the learning abstraction unit 23 completes the processing of step S158 with respect to the entirety of the messages, the abstraction processing proceeds to step S162. Meanwhile, in a case where it is determined that the learning abstraction unit 23 does not complete the processing of step S158 with respect to the entirety of messages, the processing proceeds to step S156, the message to be a processing target is changed, and processing of step S158 to step S160 is repeated.

Next, in step S162, the learning abstraction unit 23 records each of combinations of classification results obtained in step S158 in the abstracted message list 119.

Next, in step S164, the learning abstraction unit 23 determines whether or not processing of step S156 to step S162 is completed with respect to the entirety of the log files included in the log file list 118 obtained in step S104. In a case where the learning abstraction unit 23 determines that the processing of step S156 to step S162 with respect to the entirety of the log files is completed, the abstraction processing is completed. Meanwhile, in a case where the learning abstraction unit 23 determines that the processing of step S156 to step S162 with respect to the entirety of the log files is not completed, the processing proceeds to step S132. Therefore, the learning abstraction unit 23 changes a log file to be a processing target, and repeats processing of step S156 to step S164.

Figure 24:
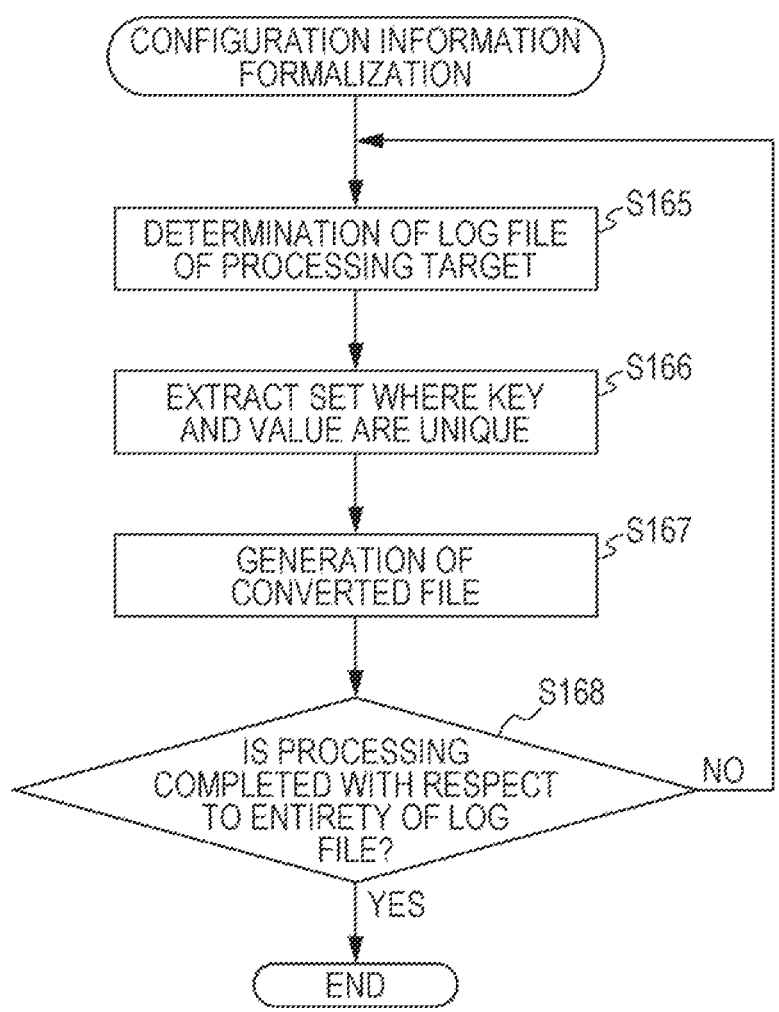
FIG. 24 is a flow chart illustrating an example of configuration information formalization processing according to the first embodiment.

Next, in step S108 of learning processing illustrated in FIG. 20, the configuration information formalization unit 24 performs configuration information formalization processing illustrated in detail in FIG. 24.

In step S165 of the configuration information formalization processing illustrated in FIG. 24, the configuration information formalization unit 24 determines a log file to be a processing target from the log file included in the log file list 118 obtained in step S104.

Next, in step S166, the configuration information formalization unit 24 extracts each of combinations with unique keys and values corresponding to the log file to be a processing target from the abstracted message list 119 obtained in step S106.

Next, in step S167, the configuration information formalization unit 24 generates the converted file 112 based on each of sets of keys and values obtained in step S166 with respect to the log file to be a processing target.

Next, in step S168, the configuration information formalization unit 24 determines whether or not processing of step S166 to step S167 is completed with respect to the entirety of the log files included in the log file list 118 obtained in step S104. In a case where the configuration information formalization unit 24 determines that the processing of step S166 to step S167 is completed with respect to the entirety of the log files, the configuration information formalization processing is completed. Meanwhile, in a case where the configuration information formalization unit 24 determines that the processing of step S166 to step S167 is not completed with respect to the entirety of the log files, the configuration information formalization processing proceeds step S165. Therefore, the configuration information formalization unit 24 changes a log file to be a processing target, and repeats processing of step S166 to step S168.

Next, in step S110 of the learning processing illustrated in FIG. 20, the configuration information formalization unit 24 determines whether or not processing of step S104 to step S108 is completed with respect to the log information during the entirety of the periods of the case data 100 to be a processing target. In a case where the configuration information formalization unit 24 determines that processing of step S104 to step S108 is completed with respect to the log information during the entirety of periods of the case data 100 to be a processing target, the learning processing proceeds to step S112. Meanwhile, in a case where the configuration information formalization unit 24 determines that the processing of step S104 to step S108 is not completed with respect to the log information during the entirety of periods of the case data 100 to be a processing target, the learning processing proceeds to step S102. Therefore, the configuration information formalization unit 24 changes log information in a period to be a processing target, and repeats processing of step S104 to step S110.

The configuration information formalization unit 24 generates the target case data 120 based on each of the converted files 112 obtained in step S108 and the case data 100 to be a processing target.

Next, in step S114, the conversion unit 21 determines whether or not processing of step S102 to step S112 is completed with respect to the entirety of the case data 100 that has received. In a case where the conversion unit 21 determines that the processing of step S102 to step S112 is completed with respect to the entirety of the case data 100, the learning processing proceeds to step S116. Meanwhile, in a case where the conversion unit 21 determines that the processing of step S102 to step S112 is not completed with respect to the entirety of the case data 100, the learning processing proceeds to step S100. Therefore, the conversion unit 21 changes case data 100 to be a processing target, and repeats processing of step S102 to step S114.

Next, in step S116, the pattern generation unit 25 records a failure type in the failure type list 121, based on each piece of the target case data obtained in step S112. In addition, in step S116, the pattern generation unit 25 records a key to be a target in the key list 122, based on each piece of the target case data obtained in step S112. In addition, in step S116, the pattern generation unit 25 generates pattern, based on each piece of the target case data obtained in step S112 and the key list 122, and records the pattern in the pattern list 123.

Next, in step S117, the learning data generation unit 26 generates the learning data based on each piece of the target case data 120, the failure type list 121 obtained in step S116, and the pattern list 123, and records the learning data in the learning data list 124. In addition, the learning data generation unit 26 records count data in the count data list 125.

Next, in step S118, the specific score calculation unit 27 calculates a specific score for every failure type and every key, based on the learning data, the count data obtained in step S117, and the above Equations (1) and (2). In addition, the specific score calculation unit 27 records each of the calculated specific scores in the specific score list 126, and completes the learning processing.

Next, in step S170 of detection processing illustrated in FIG. 21, the abstraction unit 28 obtains the configuration information and the log information of a detection target which are input. In addition, the abstraction unit 28 obtains the count data list 125 stored in the count data storage unit 54.

Next, in step S172, the abstraction unit 28 obtains the key list 122 and the learning data list 124 stored in the learning data storage unit 55.

Next, in step S174, the abstraction unit 28 obtains the specific score list 126 stored in the specific score storage unit 56.

Next, in step S104, the abstraction unit 28 performs the same log extraction processing as step S104 of the learning processing of FIG. 20 with respect to the log information of a detection target that has input.

Next, in step S106, the abstraction unit 28 performs the same abstraction processing as step S106 of the learning processing of FIG. 20 with respect to the log information of a detection target that has input.

Next, in step S108, the abstraction unit 28 performs the same configuration information formalization processing as step S108 of the learning processing of FIG. 20 with respect to the log information of a detection target that has input.

Next, in step S182, the abstraction unit 28 generates the detection target information, based on each of the converted files obtained in step S108 and the configuration information of a detection target that has input.

Next, in step S184, the detection unit 29 performs comparison on each piece of the detection target data and the learning data included in the learning data list 124 obtained in step S172, where the detection target data is represented by a set of a key and a value included in the detection target information obtained in step S182. The detection unit 29 performs the comparison processing based on the count data list 125, the learning data list 124, and the specific score list 126, obtained in step S170 to step S174.

Next, in step S186, the detection unit 29 determines whether or not the sign of failure is detected by the comparison processing of step S184. In a case where the detection unit 29 detects the sign of failure, the detection processing proceeds to step S188. Meanwhile, in a case where the detection unit 29 does not detect the sign of failure, the detection processing is completed.

In step S188, the detection unit 29 generates and outputs the sign detection result list 127 from a comparison result obtained in step S184, and completes the detection processing.

As described above, according to the first embodiment, it is possible to analyze the configuration information and the log information at the same time in a single algorithm for the data format of the configuration information by converting a data format of the log information into the data format of the configuration information. With this, it is possible to output, as a result of the detection of the failure sign, the configuration information including a possibility of setting errors and the log information at the time of the generation of failure. Accordingly, it is possible to detect the sign of system failure caused by change of the correctness of a set value of the configuration information according to a system situation.

In addition, a system provided in the cloud is complicated and diversified, and mechanism of failure to be generated is also complicated and diversified. However, it is possible to easily detect the failure by outputting, as a result of the detection of the failure sign, the configuration information including a possibility of setting errors and the log information at the time of the generation of failure, even in a complicated situation and configuration. Therefore, it is possible to cope with the failure of the system based on a large, complex cloud infrastructure.

There is a case where an operator does not completely understand the entirety of the system and is unfamiliar with a system configuration by support functions. Since the locations of setting errors may be known in the current situation, it is possible to easily detect the failure by outputting, as a result of the detection of the failure sign, the configuration information including a possibility of setting errors and the log information at the time of the generation of failure.

In addition, it is possible to preventively cope with the failure by analyzing operational data and by predicting in advance the failure that may occur with respect to a specific setting in a specific situation.

In addition, it is possible to simultaneously analyze data of different types such as the log information and the configuration information by converting the information into a format that corresponds to an analysis method of the configuration information, while not losing the original information in the log information. With this, in a case where a set value of the configuration information is changed, it is possible to detect errors in the set value depending on the operational situation, even without prior knowledge related to a condition that may be caused by a system.

The embodiment is not limited to the above-described embodiment, and it is possible to implement various modifications and applications within a range without departing from the scope of the embodiment.

Next, a second embodiment will be described. The same part as the configuration and the operation of the first embodiment will be attached with the same reference numerals, and the description thereof will not be repeated.

Figure 25:
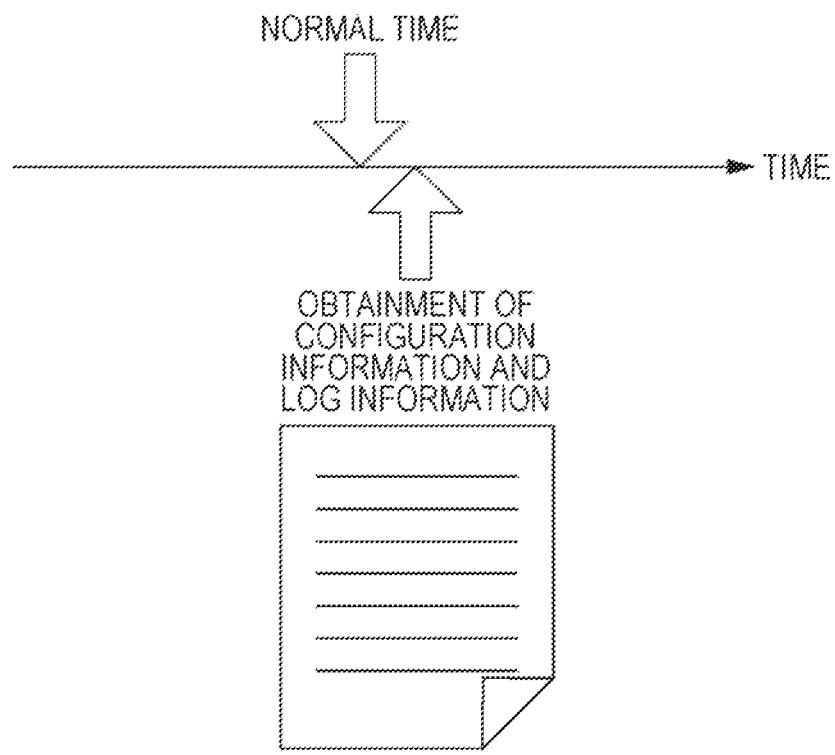
FIG. 25 is a diagram illustrating an example of collecting the configuration information and the log information at a normal time.

The second embodiment is different from the first embodiment in that information is used only at a normal time, as case data 430, as illustrated in FIG. 25. The case data 430 includes configuration information 98 and log information 99 at a normal time, as illustrated in FIG. 26.

As illustrated in FIG. 1, the sign detection device 410 according to the second embodiment is connected to the processing system 14 including a plurality of the processing devices 16 through the network 12 such as the Internet, or the like. The sign detection device 410 monitors each of the processing devices 16, and detects the sign of the generation of failure in the processing devices 16.

Figure 27:
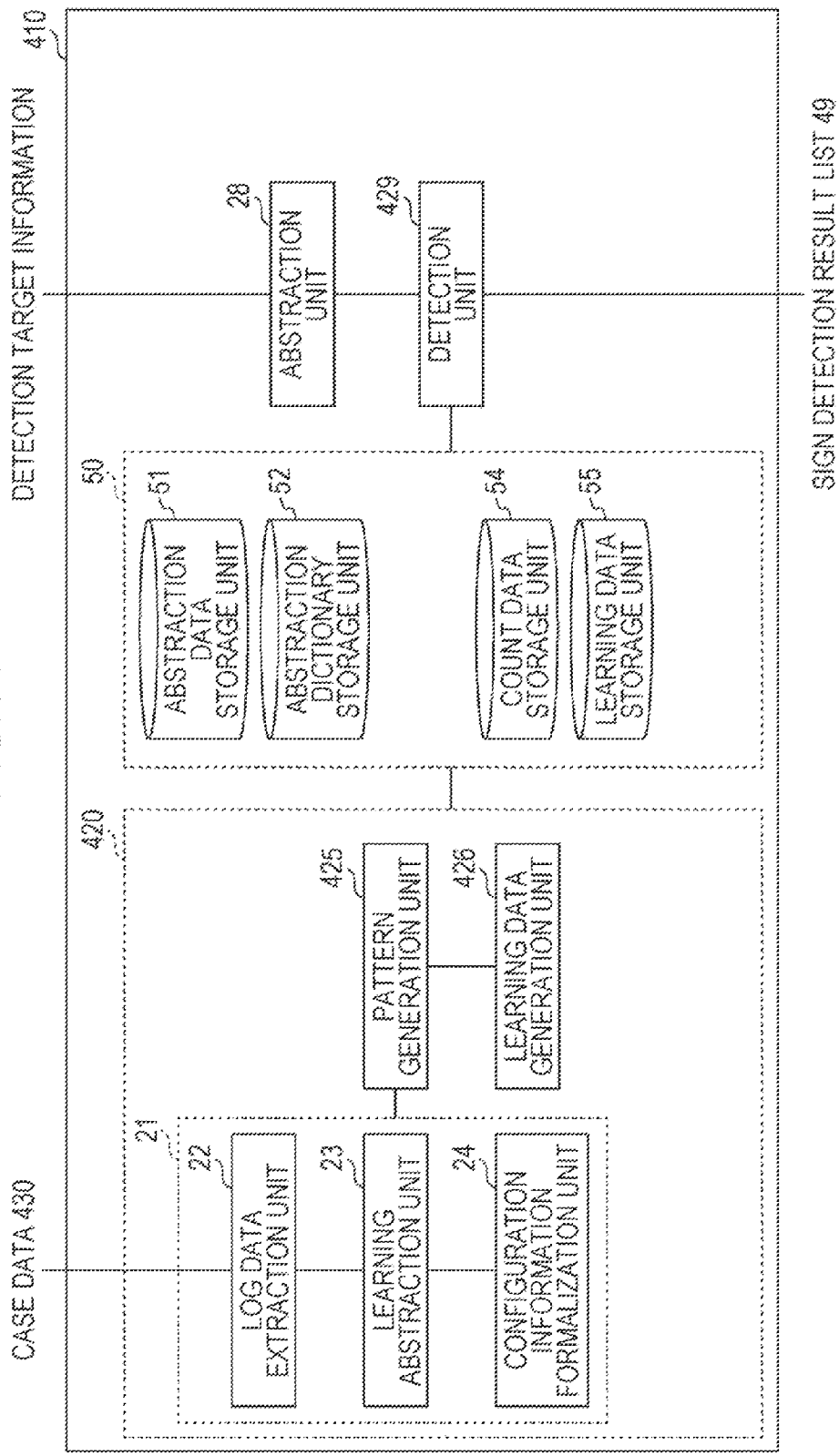
FIG. 27 is a block diagram illustrating an example of a functional configuration of a sign detection device according to a second embodiment.

FIG. 27 illustrates a functional block diagram of the sign detection device 410. As illustrated in FIG. 27, the sign detection device 410 includes a learning unit 420 including the conversion unit 21, a pattern generation unit 425, and a learning data generation unit 426, the abstraction unit 28, and a detection unit 429.

The conversion unit 21 receives a plurality of the case data 430 as input, and generates each converted file with respect to the log information included in the case data 430 in each piece of the case data 430, similar to the conversion unit 21 according to the first embodiment. In addition, the conversion unit 21 generates the target case data 421 combined the configuration information of the case data 430 and each of converted file generated with respect to the log information of the case data, in each piece of the case data 430.

The pattern generation unit 425 extracts the entirety of keys that specify various settings related to configuration items from the configuration information 98 and the converted file 112 at a normal time included in each of a plurality of the target case data 421, similar to the pattern generation unit 25 of the first embodiment. In addition, the pattern generation unit 425 lists each of the extracted keys, and creates the key list 122.

In addition, the pattern generation unit 425 generates a pattern corresponding to a failure type, a key, and a value with respect to each key recorded in the key list 122, and records the pattern in the pattern list 123.

The learning data generation unit 426 generates the learning data from each of patterns recorded in the pattern list 123 generated in the pattern generation unit 425, and records the learning data in the learning data list 124. Since the case data at a normal time is used in the second embodiment, the learning data list 124, for example, may be represented as one illustrated in FIG. 28. In addition, in the second embodiment, information stored in the learning data list 124 is an example of a predetermined pattern and a pattern indicating normal of disclosed technology. In addition, the normal time is an example of a normal state of disclosed technology.

In a case where the detection target information is input from the abstraction unit 28, the detection unit 429 detects the sign of the generation of failure by using the learning data list 124 stored in the learning data storage unit 55.

Specifically, the detection unit 429 performs comparison on the learning data and each piece of the detection target data represented by sets of a key and a value included in the detection target information. In addition, in a case where it is determined that the correct value is not set, the detection unit 29 detects the sign of the generation of failure, and outputs a sign detection result. A set including a key that does not exist in a column of "key" of the learning data list 124 is excluded from a processing target.

As described above, in the second embodiment, since only learning of the correct learning data is performed, the sign detection of failure is performed by using only the correct learning data. Therefore, the detection unit 429 compares the detection target data and the correct learning data, and detects the sign of the generation of failure in a case where the data does not coincide.

Since the sign detection device 410 according to the second embodiment is the same as the sign detection device 10 of the first embodiment, except for the configuration described above, description of a detailed configuration will not be repeated.

In addition, operation of the sign detection device 410 according to the second embodiment is different in the learning processing from operation of the sign detection device 10 according to the first embodiment in that only the case data in a normal time is used and the learning data is generated with respect to only a correct pattern. In addition, the operation of the sign detection device 410 according to the second embodiment is different in the detection processing from the operation of the sign detection device 10 according to the first embodiment in that only the correct learning data is used at the time of the sign detection of failure. Since the operation of the sign detection device 410 according to another second embodiment is the same as the sign detection device 10 according to the first embodiment, description of the operation of the sign detection device 410 according to the second embodiment will not be repeated.

As described above, according to the second embodiment, it is possible to analyze the configuration information and the log information at the same time in single algorithm in which a data format of the configuration information becomes a target, by converting a data format of the log information into the data format of the configuration information. With this, it is possible to detect the sign of system failure caused by that the correctness of a set value of the configuration information is changed according to a system situation.

The embodiment is not limited to the above-described embodiment, and it is possible to implement various modifications and applications within a range without departing from the scope of the embodiment.

For example, in first and second embodiments, a case is described where two classification results are obtained from one message, by using the same abstraction method and by using two pieces of message dictionary algorithm having different parameter values. However, the embodiment is not limited thereto. For example, an abstraction method by clustering may be used. Specifically, it is possible to obtain a classification result in which messages are classified in any one of a plurality of clusters including a plurality of sub-clusters, a name of a class including the messages becomes a key, and a name of a sub-class becomes a value corresponding to the key.

In addition, in a case where the key is obtained, and in a case where a value corresponding to the key is obtained, two typed abstraction methods not the same abstraction method may be used. Furthermore, in this case, a learning abstraction unit may be provided and two learning abstraction units may exist as an overall configuration, for every abstraction method. For example, an abstraction method by clustering is used in the abstraction unit in which the classification result to be a key is obtained, and the message dictionary algorithm is used in the abstraction unit in which the classification result to be a value corresponding to the key is obtained. In addition, a configuration of the reverse may be used.

Next, a third embodiment will be described. The third embodiment is different from the first embodiment in that a data format is unified to a format of the log information by converting a data format of the configuration information into a format of the log information, and the configuration information and the log information are analyzed in single algorithm at the same time. The format of the log information is an example of a common format of disclosed technology.

As illustrated in FIG. 1, a sign detection device 510 according to the third embodiment is connected to the processing system 14 including a plurality of the processing devices 16 through the network 12 such as the Internet, or the like. The sign detection device 510 monitors each of the processing devices 16, and detects the sign of the generation of failure in the processing devices 16.

Figure 29:
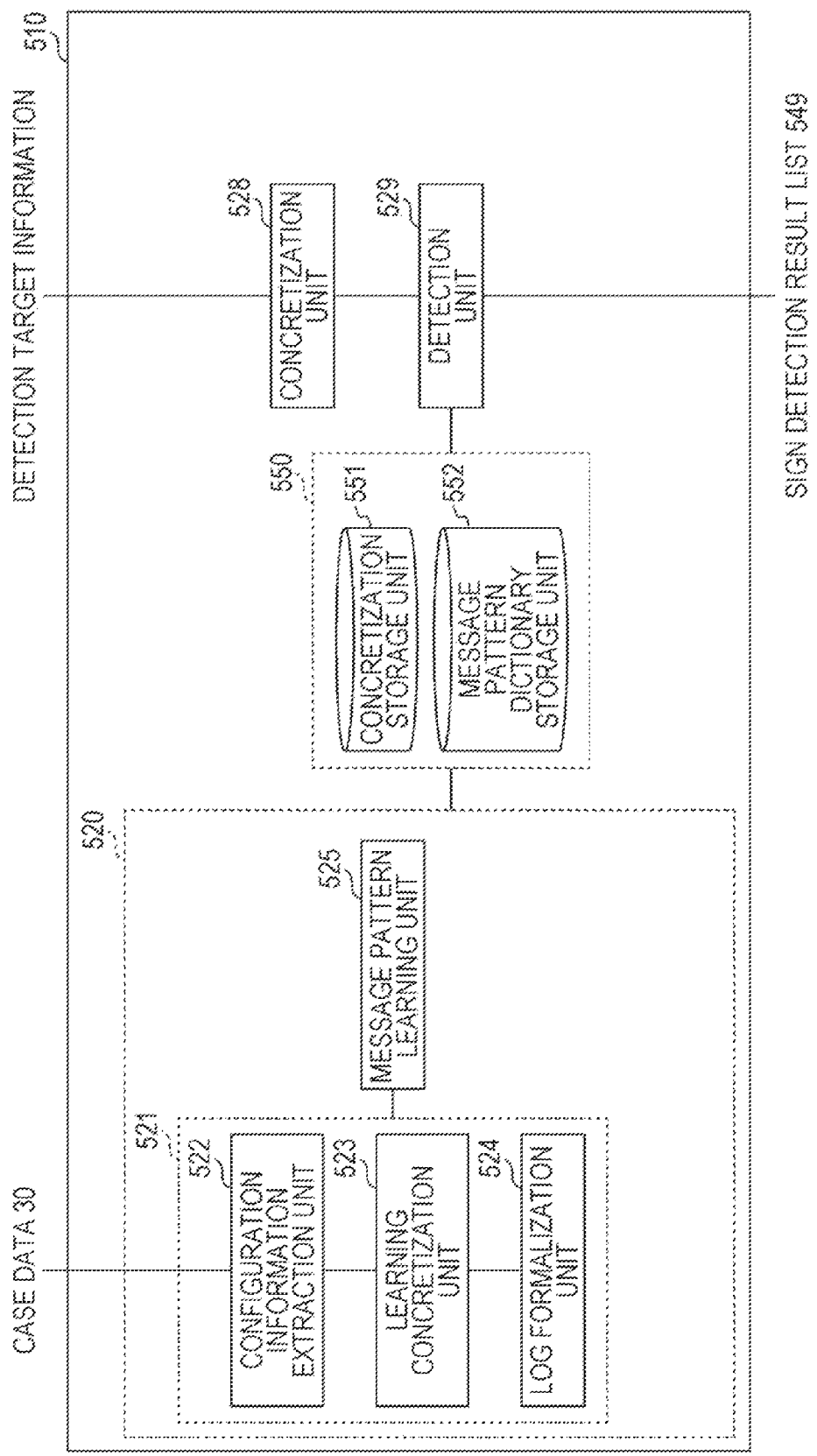
FIG. 29 is a block diagram illustrating an example of a functional configuration of a sign detection device according to a third embodiment.

FIG. 29 illustrates a block diagram of the sign detection device 510. As illustrated in FIG. 29, the sign detection device 510 includes a learning unit 520 including a conversion unit 521 and a message pattern learning unit 525, a concretization unit 528, and a detection unit 529. In addition, a concretization storage unit 551 and a message pattern dictionary storage unit 552 are stored in a storage unit 550. Information stored in each of storage units will be described below. The learning unit is an example of a sign pattern generation device of disclosed technology.

The conversion unit 521 receives a plurality of the case data 500 as input, and stores the data in a predetermined storage area. In addition, the conversion unit 521 converts a data format of the configuration information before failure recovery and after failure recovery included in each of the plurality of case data 500 that have accumulated into a format of the log information.

Figure 30:
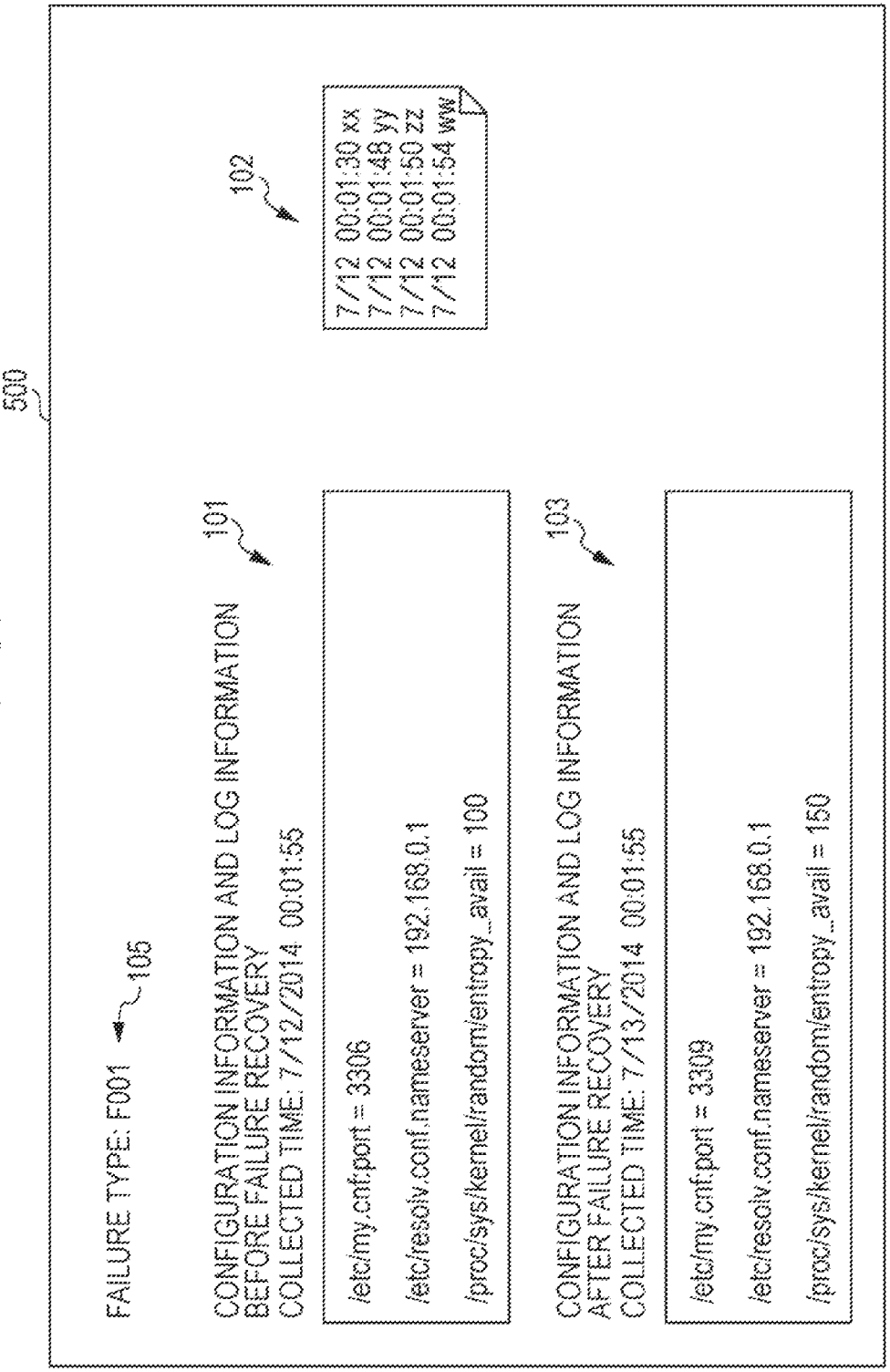
FIG. 30 is a diagram illustrating an example of case data.

In addition, as illustrated in FIG. 29, the conversion unit 521 includes a configuration information extraction unit 522, a learning concretization unit 523, and a log formalization unit 524. Since processing of the conversion unit 521 is performed on each piece of case data 500, processing on one case data 500 will be described, in the description of the configuration information extraction unit 522, the learning concretization unit 523, and the log formalization unit 524 described below. In addition, in a case where the case data 500 are multiple, it is assumed that the same processing described below is performed. As illustrated in FIG. 30, it is assumed that the configuration information 101 and 103 before and after failure recovery, the log information 102 before failure recover, and the failure type 105 are included in the case data 500.

Figure 31:
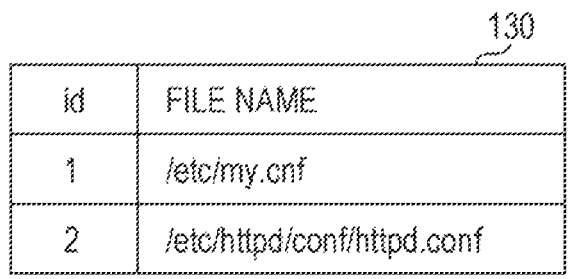
FIG. 31 is a diagram illustrating an example of a configuration file list.

The configuration information extraction unit 522 records each of names of the configuration file included in the configuration information 101 before failure recovery of the received case data 500 in the concretization storage unit 551, for example, in a configuration file list 130 illustrated in FIG. 31.

Figure 32:
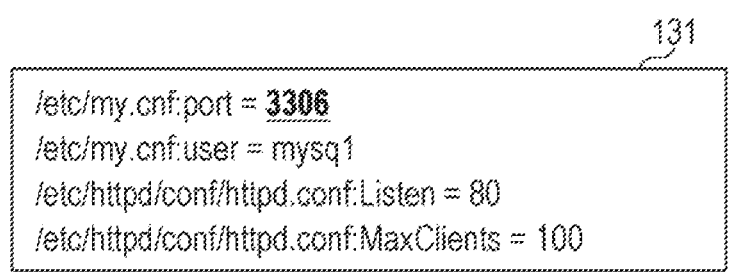
FIG. 32 is a diagram illustrating an example of a set value list.

In addition, the configuration information extraction unit 522 extracts each of sets of a key and a value included in the configuration file with respect to each of configuration files recorded in the configuration file list 130, and records the extracted result, for example, in a set value list 131 illustrated in FIG. 32. The set value list 131 represents that the key and the value are connected with "=", the left side term is the key, and the right side term is the value.

In addition, the configuration information extraction unit 522 performs the same processing on the configuration information after failure recovery. The configuration file list 130 and the set value list 131 exist for every piece of configuration information, and are stored in the concretization storage unit 551.

Figure 33:
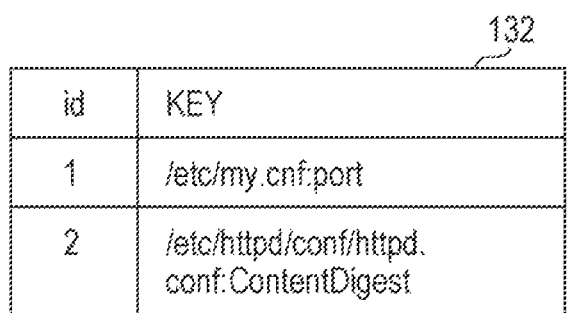
FIG. 33 is a diagram illustrating an example of a conversion target list.

The learning concretization unit 523 extracts a key in which a value thereof has changed before and after failure recovery, based on each of the set value list 131 before and after failure recovery recorded in the configuration information extraction unit 522, and records the key in, for example, a conversion target list 132 illustrated in FIG. 33. Specifically, as illustrated in FIG. 34, in a case where a set value list 131A before failure recovery and a set value list 131B after failure recovery exist, "/etc/my.cnf:port" and "/etc/httpd/conf/httpd.conf:MaxClients" are recorded in the conversion target list 132. It is assumed that the key existing in the conversion target list 132 is unique and multiple same keys do not exist therein. In addition, it is assumed that the conversion target list 132 is stored in the concretization storage unit 551.

The log formalization unit 524 generates a converted file based on each of obtainment times of the configuration information before and after failure recovery of the case data 500, the conversion target list 132, and each set value list before and after failure recovery. Specific processing will be described in operation of the sign detection device 510 described below.

FIG. 35 illustrates an example of a converted file 199. In the converted file 199 of FIG. 35, a value before failure recovery of a key to be a target is generated to exist in every window width during a predetermined period before a specific time. Meanwhile, a value after failure recovery of a key to be a target is generated to exist in every window width during a predetermined period after a specific time. It is assumed that a file name of the converted file 199 is obtained by attaching ".concretized" to a "file name" in which the key to be a target is included, and the converted file 199 is generated for every configuration file. The every window width unit is an example of a predetermined time interval of disclosed technology.

Figure 36:
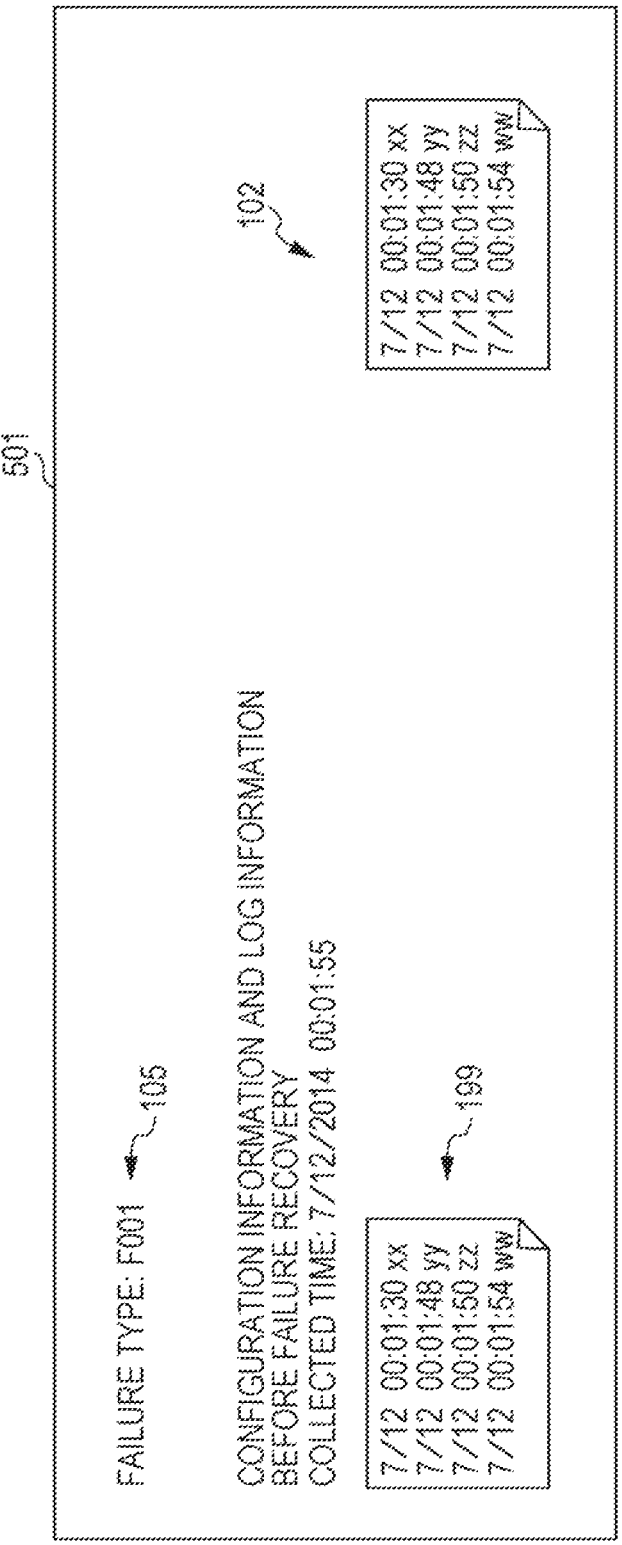
FIG. 36 is a diagram illustrating an example of target case data.

In addition, the log formalization unit 524 generates target case data 501 caused by combining each of the generated converted file 199 and the log information 102 and the failure type 105 before failure recovery of the case data 500. FIG. 36 illustrates an example of the target case data 501.

The message pattern learning unit 525 obtains messages included in each of the log file included in the log information 102 of the target case data 501 and each of the converted file 199 with respect to each piece of the target case data 501 generated in the log formalization unit 524. In addition, the message pattern learning unit 525 sorts each of the obtained messages in chronological order based on a time stamp of the message. Hereinafter, one target case data 501 will be described. However, the same processing described below will be repeated in a case where a plurality of the target case data 501 exists.

Figure 37:
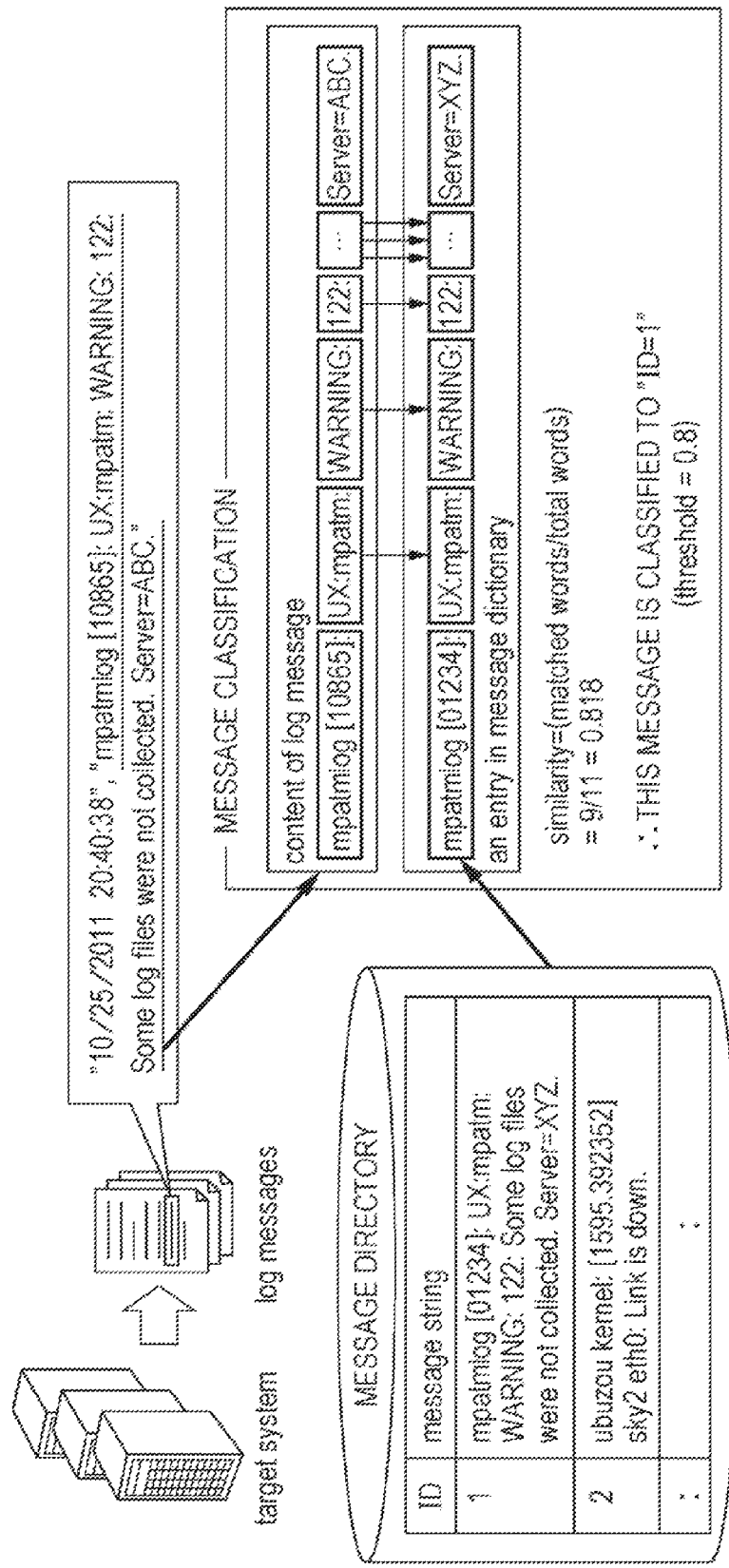
FIG. 37 is a diagram illustrating an example of classification of messages.

In addition, the message pattern learning unit 525 converts each of the messages sorted in chronological order into a corresponding number, based on the message dictionary stored in the message pattern dictionary storage unit 552. Here, it is assumed that the message dictionary associates a specific message with a specific number (ID) and is determined in advance. The message pattern learning unit 525 registers a message, which does not exist in the message dictionary, in the message dictionary as a set of a new message and a new number. Specifically, the message pattern learning unit 525, as illustrated in FIG. 37, determines whether or not a message corresponds to the message included in the message dictionary according to the degree of coincidence of each configuration (similarity) of a message included in the message dictionary and a message to be a target. In a case where the degree of coincidence is equal to or greater than a threshold value that is determined in advance, for example, equal to or greater than 0.8 in FIG. 37, a message to be a processing target is converted into a number corresponding to a message included in the message dictionary, as the message corresponds to a message included in the message dictionary.

Figure 38:
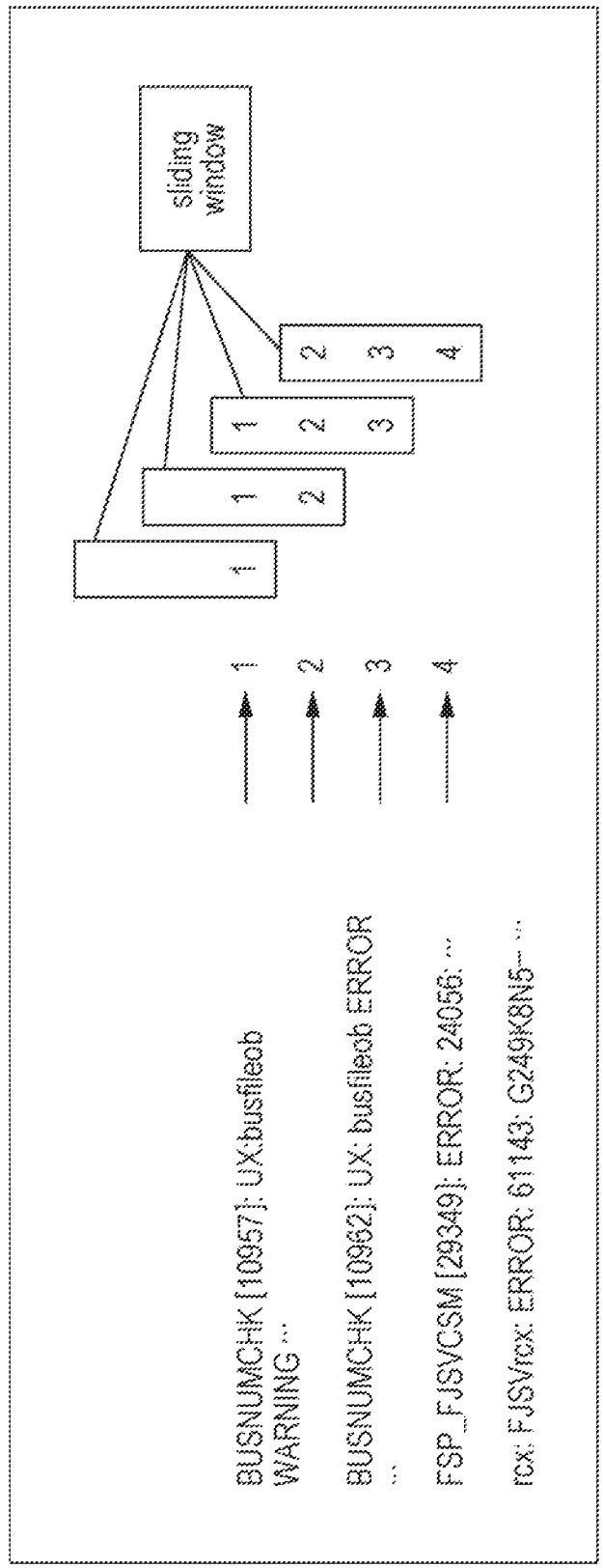
FIG. 38 is a diagram illustrating an example of extraction of message patterns.

In addition, the message pattern learning unit 525 extracts a combination of numbers while delaying by a predetermined width a window width determined in advance from the most recent message, as illustrated in FIG. 38, with respect to the message converted into the number in chronological order. In addition, the message pattern learning unit 525 processes each of the combination of the extracted number, as a message pattern representing a combination of a unit message. The window width used in the message pattern learning unit 525 is the same as the window width (details will be described below) used in the conversion unit 521. In addition, the message pattern is an example of a predetermined pattern of disclosed technology and a pattern to sign the failure.

In addition, the message pattern learning unit 525 records the number of detections for every failure type of the target case data 501 to be a processing target, for example, in a co-occurrence probability list 502 illustrated in FIG. 39, with respect to each of the obtained message pattern. Here, a column of "message pattern" of the co-occurrence probability list 502 represents a corresponding message pattern. In addition, a column of "the total number of detection" represents the total number of detection where a corresponding message pattern is detected. In addition, a column of each failure of "the number of times of detection" represents a failure type of the target case data 501 where a corresponding message pattern is detected. The message pattern learning unit 525 specifies a line in which a column of "message pattern" of the co-occurrence probability list 502 is pattern i, in a case where a message pattern i is extracted from the target case data 501 including failure type j. In addition, the message pattern learning unit 525 counts up by one a value in a column of a row of "the total number of detection" in the specified line. In addition, the message pattern learning unit 525 counts up by one a value in a column corresponding to a row of "failure j" among of columns of "the number of times of the detection" in the specified line. It is assumed that the co-occurrence probability list 502 is stored in the message pattern dictionary storage unit 552.

Figure 40:
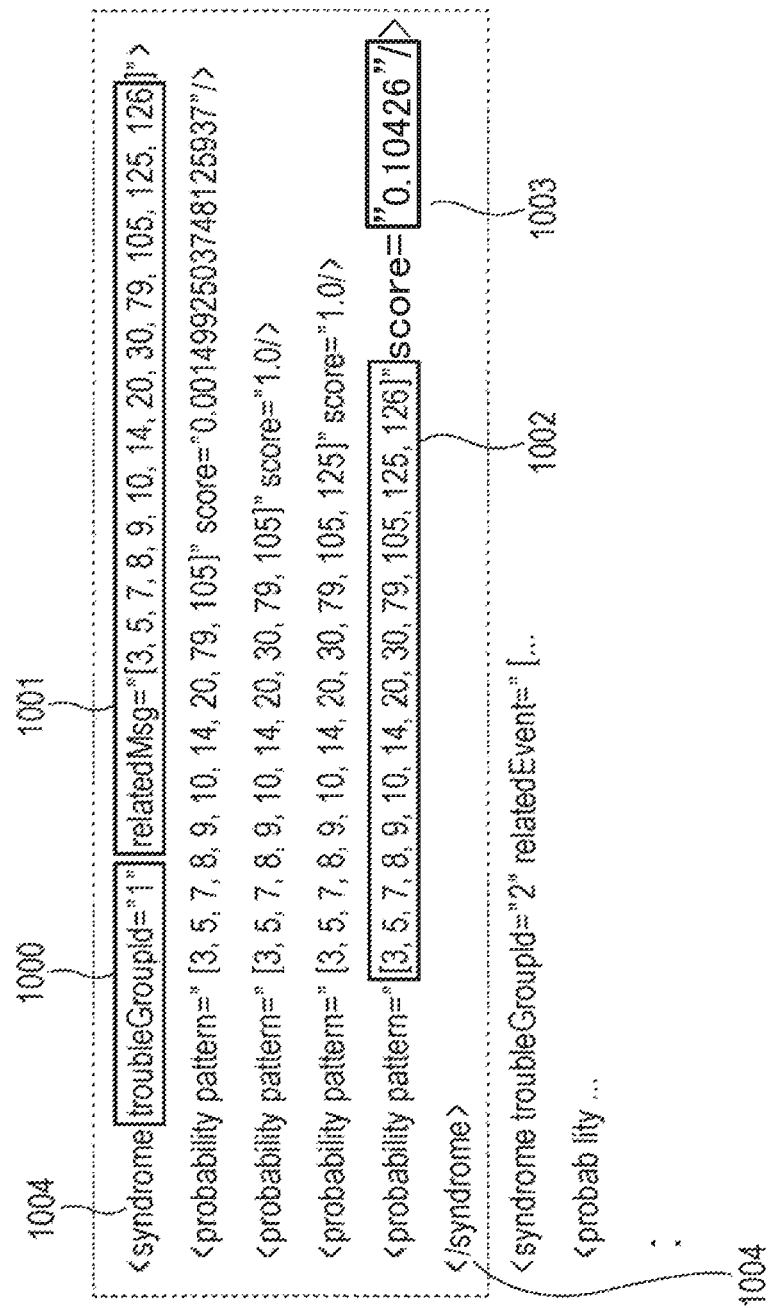
FIG. 40 is a diagram illustrating an example of learning data.

In addition, the message pattern learning unit 525 calculates each of failure probability of occurrence of message patterns for every failure case based on the co-occurrence probability list 502 after completing the above-described processing with respect to the entirety of the target case data 501, and processes the calculated result as learning data. Specifically, probability of the generation of failure of specific failure in the specific pattern may be calculated as "the number of times of pattern occurrence at the time of specific failure in a specific pattern/the number of times of the total occurrence in the specific pattern". Therefore, in the co-occurrence probability list 502 illustrated in FIG. 39, probability of the generation of failure in failure type 1 in a message pattern 1 is "2/4"="0.5". In addition, FIG. 40 illustrates an example of the learning data. Here, "troubleGroupId" 1000 of the learning data of FIG. 40 represents the number of failure type. In addition, "relatedMsg" 1001 represents a number corresponding to a message of co-occurrence relationship with a failure type to be a target. Here, the number corresponding to the message of co-occurrence relationship with the failure type to be a target is a set of all numbers included in a message pattern corresponding to the failure type to be a target. In addition, "probability pattern" 1002 represents each of numbers included in one message pattern. In addition, "score" 1003 represents the probability of the generation of failure that has calculated. In addition, "syndrome" 1004 represents starting and ending points of the learning data with respect to one failure type.

In addition, the message pattern learning unit 525 stores the learning data in the message pattern dictionary storage unit 552.

In a case where the configuration information and the log information to be a target of the sign detection are input, the concretization unit 528 converts a data format of the configuration information into a format of the log information. Specifically, the concretization unit 528 generates a converted file for every configuration file with respect to each set of a value and a key corresponding to a key included in the conversion target list 132 stored in the concretization storage unit 551, among the configuration information to be a target of the sign detection, similar to the conversion unit 521.

In addition, the concretization unit 528 generates, as the detection target information, a combination of each of the generated converted files and each piece of the log information to be a target of the sign detection. Since contents of other processing thereof is the same as that of the conversion unit 521 described above, detailed description will not be repeated. In addition, the generated converted file is generated at a time before a predetermined period from a time at which the configuration information and the log information to be a target of the sign detection are obtained.

In a case where the detection target information is input, the detection unit 529 detects the sign of the generation of failure by using the message dictionary and the learning data. Specifically, the detection unit 529 sorts each of messages included in each of files included in the detection target information in chronological order, based on the message time stamp. The detection unit 529 may generate messages that are sorted in chronological order as one file, and store the messages in the storage unit 550.

In addition, the detection unit 529 converts each of the messages that are sorted in chronological order into a corresponding number by using the message dictionary. In a case where one file in which the messages are sorted in chronological order is stored in the storage unit 550, the detection unit 529 may obtain the file and perform processing of converting the file into a corresponding number. In addition, the detection unit 529 excludes the message not having the number corresponding to the message dictionary from a processing target.

In addition, the detection unit 29 extracts a message pattern from the most recent message in the time series, while delaying by a predetermined width a window width determined in advance, with respect to the message in chronological order which is converted into the number. The window width used in the detection unit 529 is the same as a window width used in the message pattern learning unit 525. A starting position of the window may be used as a time at which the configuration information and the log information of a detection target are obtained.

In addition, the detection unit 529 detects the sign of failure based on each of the extracted message pattern and the learning data stored in the message pattern dictionary storage unit 552. Specifically, the detection is determined by whether or not the extracted message pattern exists in the learning data.

In addition, in a case where the extracted message pattern of at least equal to or greater than one exists in the learning data, the detection unit 529 records the extracted message pattern in a sign detection result list 503, for example, illustrated in FIG. 41, and outputs the extracted message pattern. An example of FIG. 41 is a case where numbers corresponding to the message included in the message pattern are "0005", "0007", "0012", and "0019", and corresponding failure type is "T001". In the third embodiment, the learning data corresponding to the message pattern corresponding to failure generation probability of equal to or greater than a threshold determined in advance may be used among the learning data. In addition, it is assumed that "0019" included in the message pattern of FIG. 41 is a number included in the message pattern by converting the configuration information into a format of the log information data.

The configuration file list 130, the set value list 131, and the conversion target list 132 are stored in the concretization storage unit 551.

The message dictionary, the co-occurrence probability list 502, and the learning data are stored in the message pattern dictionary storage unit 552.

Figure 42:
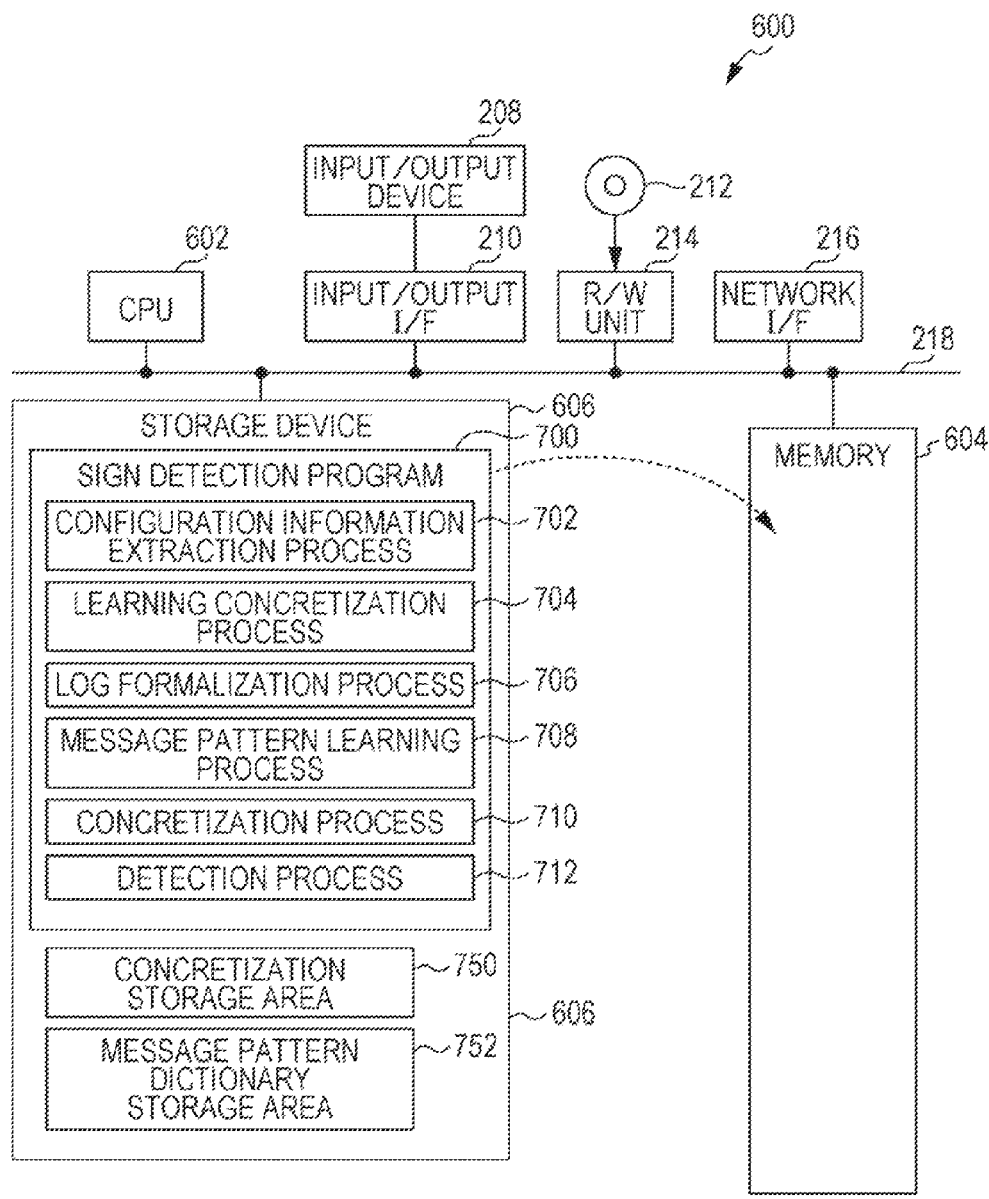
FIG. 42 is a block diagram illustrating a schematic configuration of a computer that functions as the sign detection device according to the third embodiment.

The sign detection device 510, for example, may be realized by a computer 600 illustrated in FIG. 42. The computer 600 includes a CPU 602, a memory 604 as a temporary storage area, and a non-volatile storage device 606. Since other configuration of the computer 600 is the same as that of the first embodiment, description thereof will not be repeated.

The storage device 606 may be realized by a hard disk drive (HDD), a solid state drive (SSD), flash memory, or the like. A sign detection program 700 for causing the computer 600 to function as the sign detection device 510 is stored in the storage device 606 as a recording medium. In addition, the storage device 606 includes a concretization storage area 750 on which the configuration file list 130, the set value list 131, and the conversion target list 132 are stored, and a message pattern dictionary storage area 752 on which the message dictionary, the co-occurrence probability list 502, and the learning data are stored.

The CPU 602 reads the sign detection program 700 from the storage device 606, stores the program in the memory 604, and sequentially performs process included in the sign detection program 700. In addition, the CPU 602 reads the configuration file list 130, the set value list 131, and the conversion target list 132 stored in a concretization process 710, and stores the lists in the memory 604. In addition, the CPU 602 reads the message dictionary, the co-occurrence probability list 502, and the learning data stored in the message pattern dictionary storage area 752, and stores the read result in the memory 604.

The sign detection program 700 includes a configuration information extraction process 702, a learning concretization process 704, a log formalization process 706, a message pattern learning process 708, a concretization process 710, and a detection process 712.

The CPU 602 is operated as the configuration information extraction unit 522 illustrated in FIG. 29 by performing the configuration information extraction process 702. In addition, the CPU 602 is operated as the learning concretization unit 523 illustrated in FIG. 29 by performing the learning concretization process 704. In addition, the CPU 602 is operated as the log formalization unit 524 illustrated in FIG. 29 by performing the log formalization process 706. In addition, the CPU 602 is operated as the message pattern learning unit 525 illustrated in FIG. 29 by performing the message pattern learning process 708. In addition, the CPU 602 is operated as the concretization unit 528 illustrated in FIG. 29 by performing the concretization process 710. In addition, the CPU 602 is operated as the detection unit 529 illustrated in FIG. 29 by performing the detection process 712. With this, the computer 600 in which the sign detection program 700 is performed functions as the sign detection device 510.

The sign detection device 510 may be realized, for example, by a semiconductor integrated circuit, more specifically, an application specific integrated circuit (ASIC), and the like.

Figure 43:
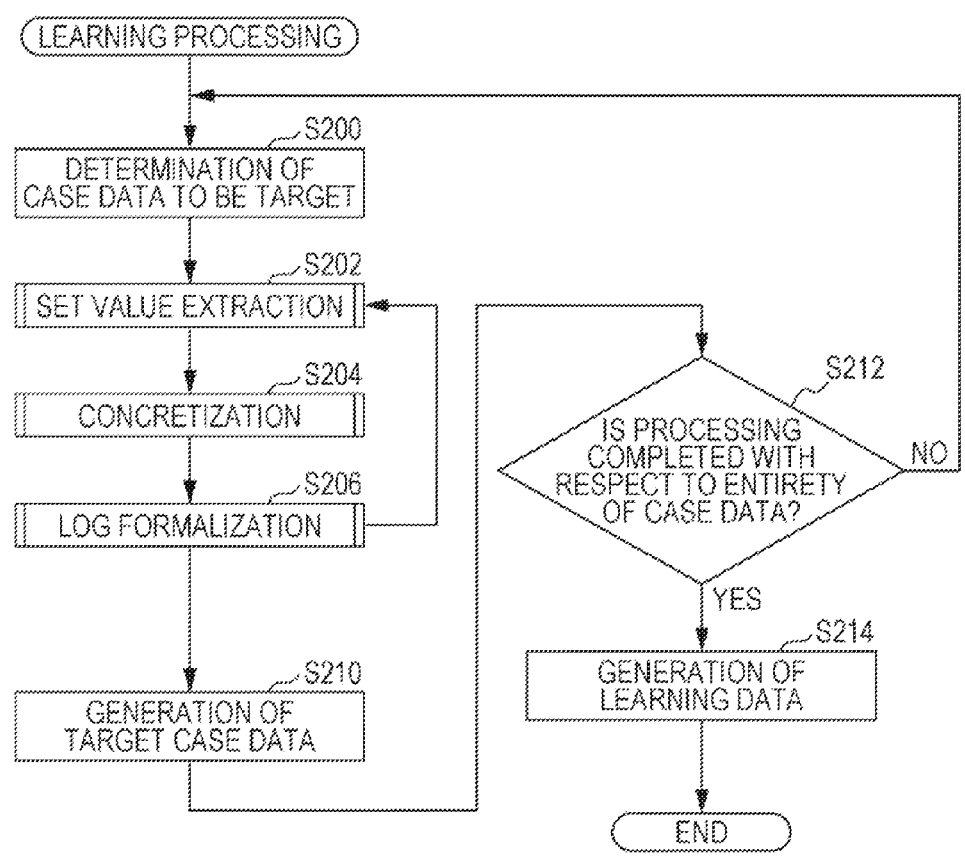
FIG. 43 is a flow chart illustrating an example of learning processing according to the third embodiment.
Figure 44:
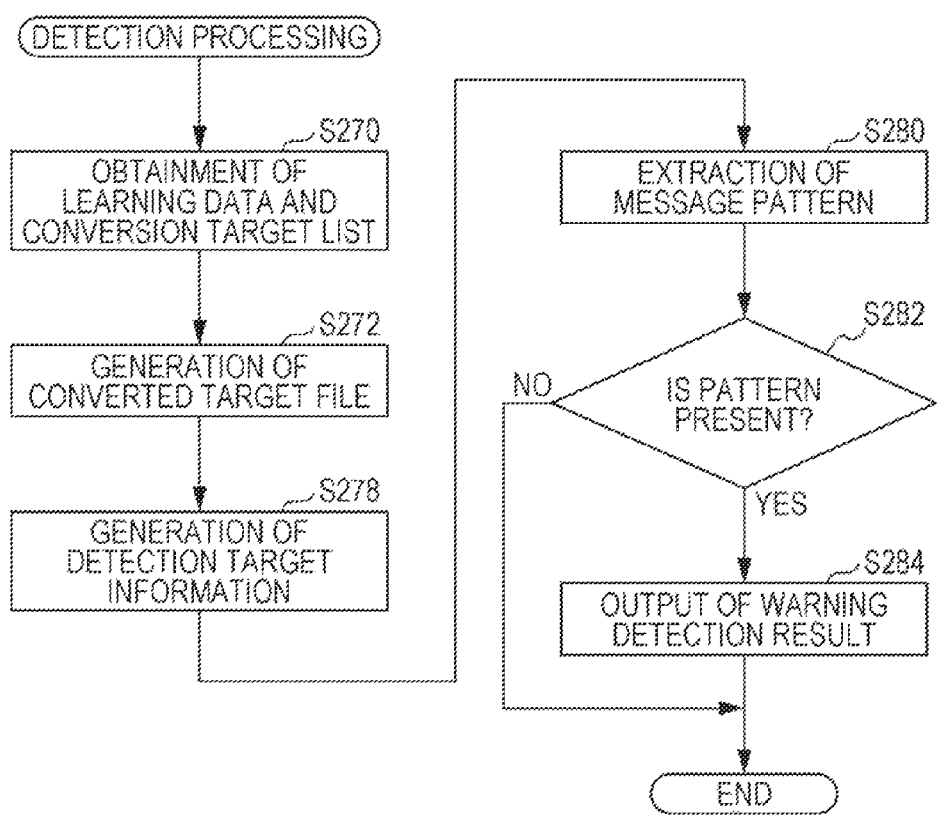
FIG. 44 is a flow chart illustrating an example of detection processing according to the third embodiment.

Next, operation of the sign detection device 510 according to this embodiment will be described. First, when a plurality of the case data 500 is input to the sign detection device 510, learning processing illustrated in FIG. 43 is performed in the sign detection device 510. Therefore, the configuration file list 130, the set value list 131, the conversion target list 132, the co-occurrence probability list 502, and the learning data are stored in the storage unit 550. In this state, when the configuration information and the log information of a detection target are input to the sign detection device 510, detection processing illustrated in FIG. 44 is performed in the sign detection device 510, and a sign detection result list 503 is output from the device. The learning processing and the detection processing performed by the sign detection device 510 are examples of a sign pattern generation method and a sign detection method of disclosed technology. Hereinafter, each processing will be described in detail.

In step S200 of the learning processing illustrated in FIG. 43, the configuration information extraction unit 522 determines case data 500 to be a processing target from each piece of the received case data 500.

Figure 45:
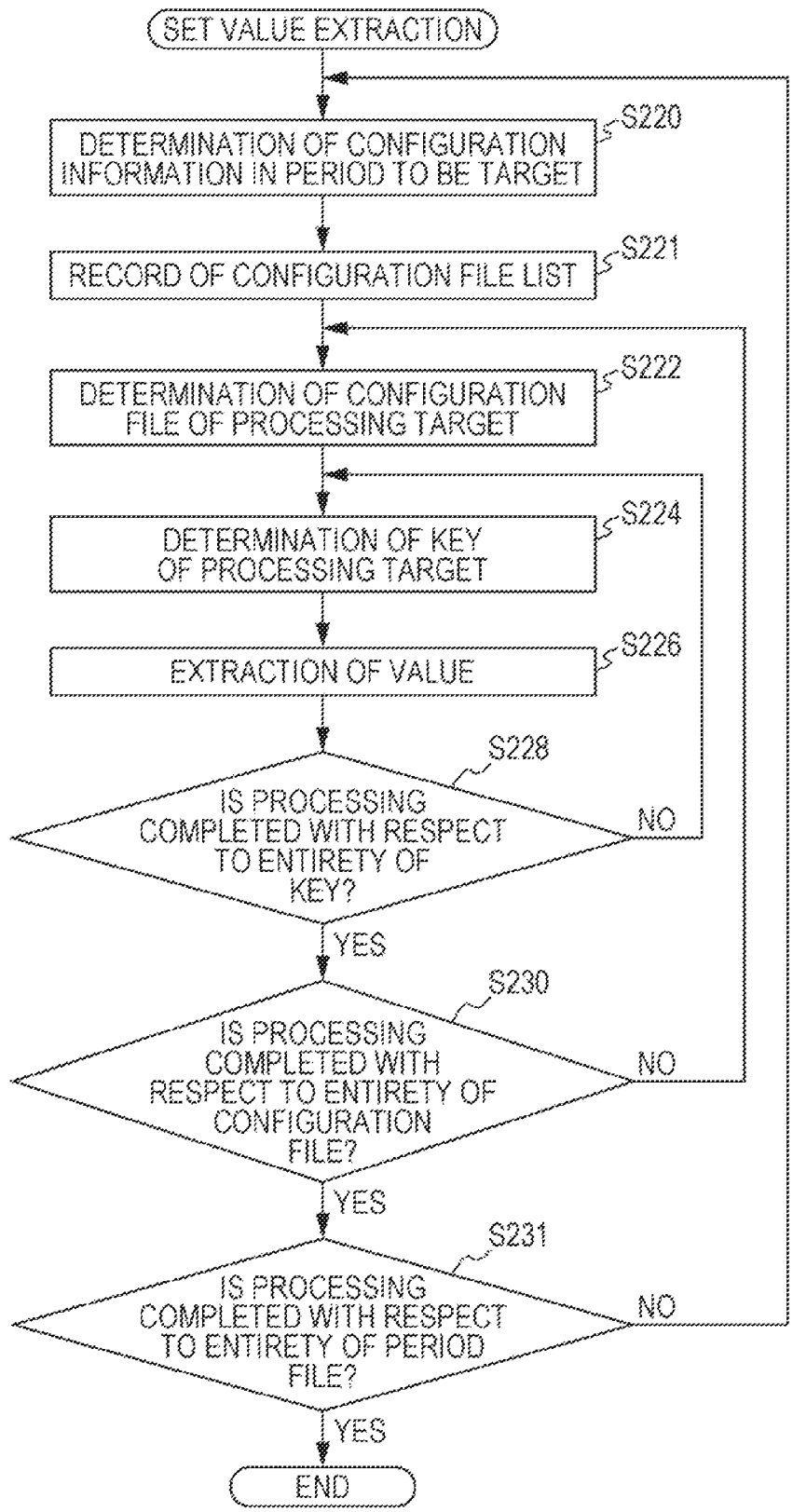
FIG. 45 is a flow chart illustrating an example of set value extraction processing according to the third embodiment.

Next, in step S202, the configuration information extraction unit 522 performs set value extraction processing illustrated in detail in FIG. 45 on each piece of the configuration information before and after failure recovery included in the case data 500 of a processing target.

In step S220 of the set value extraction processing illustrated in FIG. 45, the configuration information extraction unit 522 determines configuration information in a period (before failure recovery or after failure recovery) to be a processing target.

Next, in step S221, the configuration information extraction unit 522 stores each of configuration file names included in the configuration information to be a processing target in the configuration file list 130.

Next, in step S222, the configuration information extraction unit 522 determines a configuration file of a processing target from each of configuration files corresponding to each of file names stored in the configuration file list 130.

Next, in step S224, the configuration information extraction unit 522 determines a key to be a processing target from each of keys included in the configuration file to be a processing target.

Next, in step S226, the configuration information extraction unit 522 extracts a value corresponding to a key to be a processing target, and stores a set of a key to be a processing target and a corresponding value in the set value list 131.

Next, in step S228, the configuration information extraction unit 522 determines whether or not processing of step S226 is completed with respect to the entirety of keys included in a configuration file to be a processing target. In a case where the configuration information extraction unit 522 determines that the processing of step S226 with respect to the entirety of keys is completed, the set value extraction processing proceeds to step S230. Meanwhile, in a case where the configuration information extraction unit 522 determines that the processing of step S226 with respect to the entirety of keys is not completed, processing proceeds to step S224, a key to be a processing target is changed, and processing of step S226 to step S228 is repeated.

Next, in step S230, the configuration information extraction unit 522 determines whether or not processing of step S224 to step S228 is completed with respect to the entirety of the configuration file included in step S221. In a case where the configuration information extraction unit 522 determines that the processing of step S224 to step S228 is completed with respect to the entirety of the configuration file, the set value extraction processing proceeds to step S231. Meanwhile, in a case where the configuration information extraction unit 522 determines that the processing of step S224 to step S228 is not completed with respect to the entirety of the configuration file, the set value extraction processing proceeds to step S222. Therefore, the configuration information extraction unit 522 changes the configuration file to be a processing target, and processing of step S224 to step S230 is repeated.

Next, in step S231, the configuration information extraction unit 522 determines whether or not processing of step S221 to step S230 is completed with respect to the configuration information to be a processing target in the entirety of a period. In a case where the configuration information extraction unit 522 determines that the processing of step S221 to step S230 is completed with respect to the configuration information to be a processing target during the entirety of a period, the set value extraction processing is completed. Meanwhile, the configuration information extraction unit 522 determines that the processing of step S221 to step S230 is not completed with respect to the configuration information to be a processing target during the entirety of a period, the set value extraction processing proceeds to step S220. Therefore, the configuration information extraction unit 522 changes the configuration information during a period to be a processing target, and processing of step S221 to step S231 is repeated.

Figure 46:
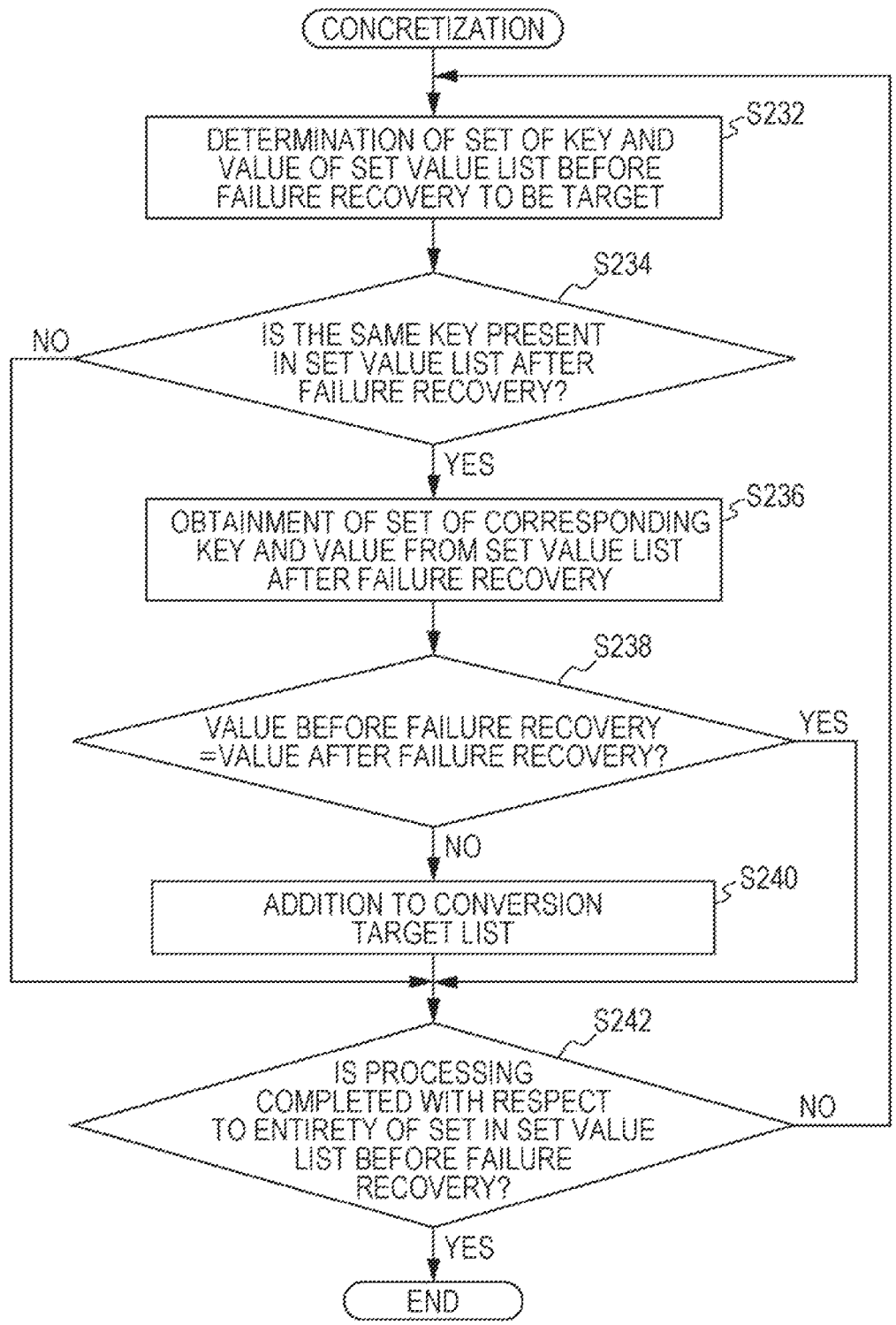
FIG. 46 is a flow chart illustrating an example of concretization processing according to the third embodiment.

In step S204 of the learning processing illustrated in FIG. 43, the learning concretization unit 523 performs concretization processing illustrated in detail in FIG. 46 on the case data 500 to be a processing target.

In step S232 of the concretization processing illustrated in FIG. 46, the learning concretization unit 523 determines a set of a key and a value to be a processing target from a set value list extracted from the configuration information before failure recovery obtained in step S202.

Next, in step S234, the learning concretization unit 523 determines whether or not a key that coincides with a key of a set to be a processing target exists in the set value list extracted from the configuration information after failure recovery obtained in step S202. In a case where the key that coincides with a key of a set to be a processing target exists in the set value list extracted from the configuration information after failure recovery, the concretization processing proceeds to step S236. Meanwhile, in a case where the key that coincides with a key of a set to be a processing target does not exist in the set value list extracted from the configuration information after failure recovery, the concretization processing proceeds to step S242.

Next, in step S236, the learning concretization unit 523 obtains a set of a key and a value corresponding to a key that coincides with a set to be a processing target from the set value list extracted from the configuration information after failure recovery.

Next, in step S238, the learning concretization unit 523 determines whether or not a value of a set to be a processing target coincides with a value of a set obtained in step S236. In a case where the learning concretization unit 523 determines that the values coincide, the concretization processing proceeds to step S242. Meanwhile, in a case where the learning concretization unit 523 determines that the values do not coincide, the concretization processing proceeds to step S240.

Next, in step S240, the learning concretization unit 523 stores a key to be a processing target in the conversion target list 132.

Next, in step S242, the learning concretization unit 523 determines whether or not processing of step S234 to step S238 or step S240 is completed with respect to the entirety of sets included in the set value list extracted from the configuration information before failure recovery. In a case where the learning concretization unit 523 determines whether or not the processing of step S234 to step S238 or step S240 is completed with respect to the entirety of sets included in the set value list extracted from the configuration information before failure recovery, the concretization processing is completed. Meanwhile, in a case where the learning concretization unit 523 determines whether or not the processing of step S234 to step S238 or step S240 is not completed with respect to the entirety of sets included in the set value list extracted from the configuration information, the concretization processing proceeds to step S232. Therefore, the learning concretization unit 523 changes a set to be a processing target, and processing of step S234 to step S242 is repeated.

Figure 47:
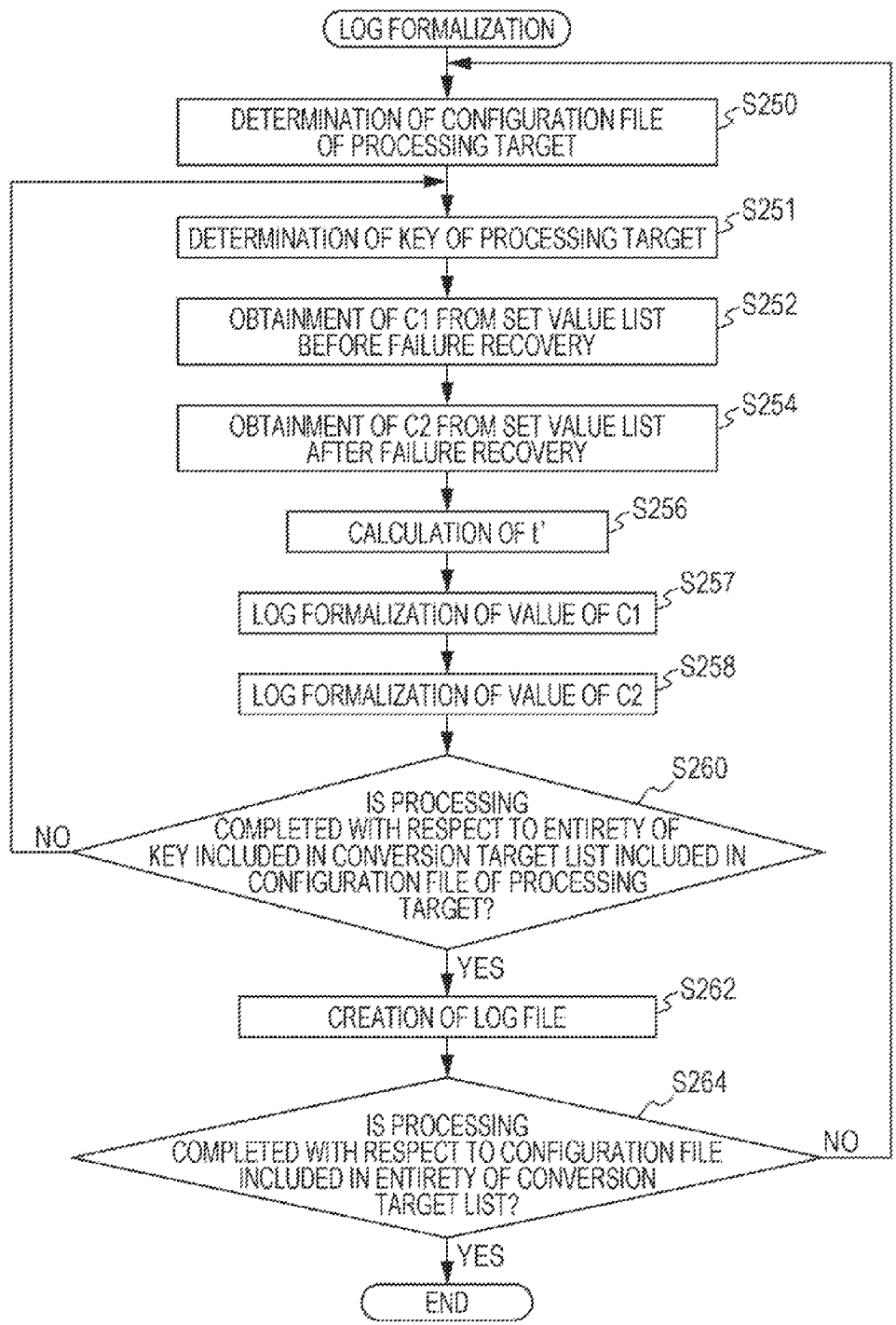
FIG. 47 is a flow chart illustrating an example of log formalization processing according to the third embodiment.

In step S206 of the learning processing illustrated in FIG. 43, the log formalization unit 524 performs log formalization processing illustrated in detail in FIG. 47 on the case data 500 to be a processing target.

In step S250 of the log formalization processing illustrated in FIG. 47, the log formalization unit 524 determines a configuration file to be a processing target from each of the configuration file of each key included in the conversion target list 132 obtained in step S204.

Next, in step S251, the log formalization unit 524 determines a key in a configuration file of a processing target, included in the conversion target list 132 obtained in step S204.

Next, in step S252, the log formalization unit 524 obtains a combination C1 of a value and a key that coincides with a key to be a processing target from the set value list before failure recovery obtained in step S202.

Next, in step S254, the log formalization unit 524 obtains a combination C2 of a value and a key that coincides with a key to be a processing target from the set value list after failure recovery obtained in step S202.

Next, in step S256, the log formalization unit 524 calculates t'. Here, t' is calculated by the following Equation (3). $t_1$ is an obtainment time of the configuration information and the log information before failure recovery of the case data 500, and $t_2$ is an obtainment time of the configuration information after failure recovery of the case data 500. t' may be calculated by another method so that the calculated t' is given between $t_1$ to $t_2$. In addition, a change time of the configuration information is obtained, and t' may be calculated by using the obtained change time.

$$t' = t_1 + (t_2 - t_1)/2 \quad (3)$$

Next, in step S257, the log formalization unit 524 generates a time stamp for every time interval w between a time "$t_1$–h" to a time "$t_1$", and generates C1 for every generated time stamp as a log format. Here, h is a generation period of log that is determined in advance, and w is a window width that is determined in advance.

Next, in step S258, the log formalization unit 524 generates, between a time "min (t', $t_2$–h)" to a time "$t_2$", a time stamp for every time interval w, and generates C2 for every generated time stamp as a log format. Specifically, as illustrated in FIG. 35, the generated time stamp, a parameter name (for example, port) included in a key to be a target, and a value corresponding to a key to be a target are formalized in log. A combination of the time stamp, the key to be a target and the value corresponding to the key to be a target which are formalized in log becomes one message.

Next, in step S260, the log formalization unit 524 determines whether or not processing of step S252 to step S258 is completed with respect to the entirety of keys included in the configuration file to be a processing target and included in the conversion target list 132. In a case where the log formalization unit 524 determines that the processing of step S252 to step S258 is completed with respect to the entirety of keys, the log formalization processing proceeds to step S262. Meanwhile, in a case where the log formalization unit 524 determines that the processing of step S252 to step S258 is not completed with respect to the entirety of keys, the log formalization processing proceeds to step S251. Therefore, the log formalization unit 524 changes a key to be a processing target, and processing of step S252 to step S260 is repeated.

Next, in step S262, the log formalization unit 524 combines each log obtained in step S257 with each log obtained in step S258 to generate a converted file with a file name defined based on the configuration file of a processing target.

Next, in step S264, the log formalization unit 524 determines whether or not processing of step S251 to step S262 is completed with respect to the entirety of the configuration file corresponding to each key included in the conversion target list 132. In a case where the log formalization unit 524 determines that the processing of step S251 to step S262 is completed with respect to the entirety of the configuration file, the log formalization processing is completed. Meanwhile, in a case where the log formalization unit 524 determines that the processing of step S251 to step S262 is not completed with respect to the entirety of the configuration file, the log formalization processing proceeds to step S250. Therefore, the log formalization unit 524 changes a configuration file to be a processing target, and processing of step S251 to step S264 is repeated.

In step S210 of the learning processing illustrated in FIG. 43, the log formalization unit 524 generates the target case data 501 in which each of converted files obtained in step S206 and the log information and failure cases before failure recovery of the case data 500 to be a processing target are combined.

Next, in step S212, the log formalization unit 524 determines whether or not processing of step S202 to step S210 is completed with respect to the entirety of the received case data 500. In a case where the log formalization unit 524 determines that the processing of step S202 to step S210 is completed with respect to the entirety of the case data 500, the learning processing proceeds to step S214. Meanwhile, in a case where the log formalization unit 524 determines that the processing of step S202 to step S210 is not completed with respect to the entirety of the case data 500, the learning processing proceeds to step S200. Therefore, the log formalization unit 524 changes the case data 500 to be a processing target, and processing of step S202 to step S212 is repeated.

Next, in step S214, the message pattern learning unit 525 generates the learning data based on the target case data 501 obtained in step S210 and a message dictionary stored in the message pattern dictionary storage unit 552, and the learning processing is completed. In the generation of the learning data, a window width at the time of extracting the message pattern is the same as a time interval w of the time stamp in each message in which the configuration information is formalized in log. Therefore, in many cases, a number converted from a message in which the configuration information is formalized in log is included in each message pattern of the learning data.

Next, in step S270 of the detection processing illustrated in FIG. 44, the conversion unit 521 obtains the configuration information and the log information of a detection target that have input. In addition, the conversion unit 521 obtains the conversion target list 132 stored in the concretization storage unit 551 and the learning data stored in the message pattern dictionary storage unit 552.

Next, in step S272, the concretization unit 528 generates a converted target file with respect to each of configuration files corresponding to a key included in the conversion target list 132 obtained in step S270 among the configuration files included in configuration information of a detection target.

Next, in step S278, the concretization unit 528 generates a combination of the log information of a detection target that has input and each of the converted target files obtained in step S272, as the detection target information.

Next, in step S280, the detection unit 529 extracts each message pattern based on the detection target information obtained in step S278, the message dictionary stored in the message pattern dictionary storage unit 552, and the window width w determined in advance.

Next, in step S282, the detection unit 529 determines whether or not message pattern, obtained in step S280, of at least equal to or greater than one in the learning data obtained in step S270 exists. In a case where the detection unit 529 determines that the obtained message pattern of at least equal to or greater than one in the learning data exists, detection processing proceeds to step S284. Meanwhile, in a case where the detection unit 529 determines that the obtained message pattern in the learning data does not exist, the detection processing is completed.

Next, in step S284, the detection unit 529 generates and outputs a sign detection result based on each of the message pattern existing in the learning data obtained in step S282 and the learning data obtained in step S270, and the detection processing is completed.

As described above, according to the third embodiment, it is possible to analyze the configuration information and the log information at the same time in single algorithm in which a data format of the log information becomes a target by converting a data format of the configuration information into the data format of the log information. With this, it is possible to output, as a result of the detection of the failure sign, the message pattern including a message in which the configuration information including a possibility of setting errors is formalized in log and a message included in the log information at the time of the generation of failure. Accordingly, it is possible to detect the sign of system failure by changing the correctness in a set value of the configuration information according to a system situation.

In addition, it is possible to detect abnormality of a set value that the correctness of the set value according to a system situation is changed.

The embodiment is not limited to the above-described embodiment, and it is possible to implement various modifications and applications within a range without departing from the scope of the embodiment.

Next, a fourth embodiment will be described. The same part as the configuration and the operation of the third embodiment will be attached with the same reference numerals, and the description thereof will not be repeated.

The fourth embodiment is different from the first embodiment in that information is used, as the case data 830, in only a normal time as illustrated in FIG. 25. Since the case data 830 includes the configuration information and the log information at a normal time and has the same configuration as the case data 500, detailed description will not be repeated.

As illustrated in FIG. 1, a sign detection device 810 according to the fourth embodiment is connected to the processing system 14 including a plurality of the processing devices 16 through the network 12 such as the Internet. The sign detection device 410 monitors each of the processing devices 16, and detects the sign of the generation of failure in the processing devices 16.

Figure 48:
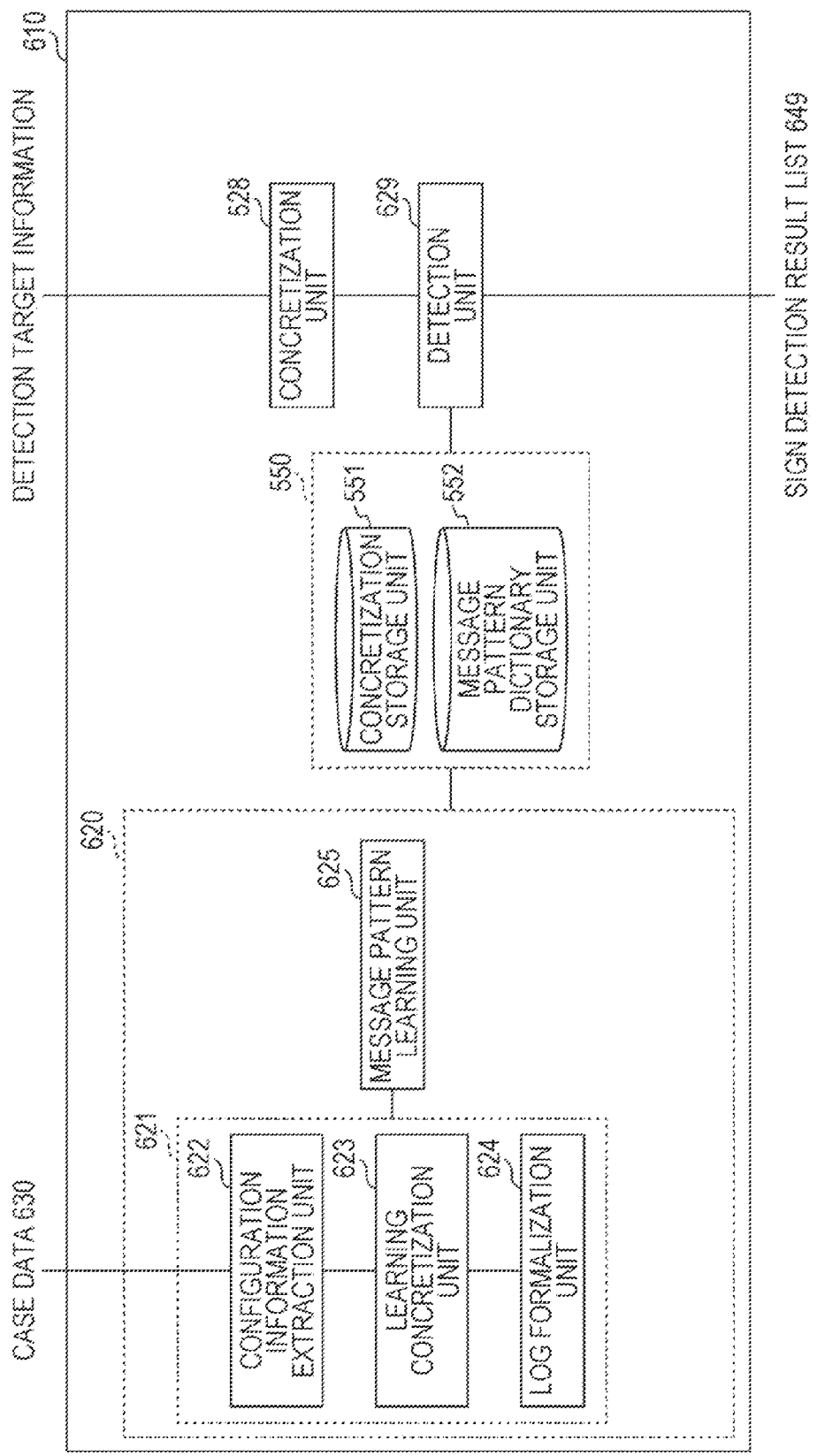
FIG. 48 is a block diagram illustrating an example of a functional configuration of a sign detection device according to a fourth embodiment.

FIG. 48 illustrates a function block diagram of the sign detection device 810. As illustrated in FIG. 48, the sign detection device 810 includes a learning unit 820 including a conversion unit 821 and a message pattern learning unit 825, a concretization unit 528, and a detection unit 829. Since another configuration is the same as the third embodiment, description will not be repeated.

The conversion unit 821 receives a plurality of the case data 830, extracts the entirety of keys included in the configuration information included in the case data 830 for every case data 830, and records the extracted result in the conversion target list 132, similar to the conversion unit 521 according to the third embodiment. A value of a key is unique and the same key is not recorded in plural in the conversion target list 132.

In addition, the conversion unit 821 generates a converted file in the entirety of configuration files corresponding to keys included in the conversion target list 132 with respect to each piece of the case data 830, similar to the concretization unit 528 of the third embodiment. In addition, the conversion unit 821 generates target case data 801 in which each of the converted files and each piece of the log information of the case data 830 are combined, with respect to each piece of the case data 830, similar to the log formalization unit 524 of the third embodiment.

The message pattern learning unit 825 sorts messages included in the target case data 801 in chronological order with respect to each piece of the target case data 801 generated in the conversion unit 821. Hereinafter, processing for one of the target case data 801 is described. However, in a case where a plurality of the target case data 801 exists, processing described below is repeated. In addition, the message pattern learning unit 825 converts each of the messages included in the target case data 801 into a corresponding number, based on the message dictionary stored in the message pattern dictionary storage unit 552.

In addition, the message pattern learning unit 825 extracts a combination of numbers from the most recent message, while delaying by a predetermined width a window width determined in advance, with respect to the message converted into the number in chronological order. Therefore, the message pattern learning unit 825 processes each combination of the extracted number as the message pattern.

In addition, the message pattern learning unit 825 generates each of the obtained message pattern as the learning data of the message pattern at a normal time, and stores the generated pattern in the message pattern dictionary storage unit 552. FIG. 49 illustrates an example of the learning data. Here, "T999" in a column of "failure" of FIG. 49 is a number of a failure type defined to represent a normal state.

In a case where the log information and the configuration information in which a format is converted are input, the detection unit 829 detects the sign of the generation of failure by using the learning data. Specifically, the detection unit 829 sorts in chronological order each of the messages included in each of files included in the detection target information. In addition, the detection unit 829 converts each of the messages sorted in chronological order into a corresponding number by using the message dictionary. In addition, the detection unit 829 extracts a message pattern from the most recent message in chronological order while delaying by a predetermined width a window width determined in advance, with respect to the converted messages in chronological order.

In addition, in a case where message patterns of at least equal to or greater than one do not coincide with message pattern included in the learning data, among each of the extracted message pattern, the detection unit 829 detects the generation of failure, records the detected generation of failure in a sign detection result list 803, and outputs the generation of failure. FIG. 50 illustrates an example of the sign detection result list 803.

Since the sign detection device 810 according to the fourth embodiment is the same as the third embodiment, except for the above-described configuration, description of a detailed configuration will not be repeated.

In addition, operation of the sign detection device 810 according to the fourth embodiment is different from the third embodiment in that the configuration information is converted into a data format of the log information with respect to only the case data at a normal time. In addition, the operation is also different from the third embodiment in that learning is performed, as the learning data, on only the message pattern at a normal time, and the failure is detected in a case where a message pattern not included in the learning data is detected in the detection target information. Since another operation of the sign detection device 810 according to the fourth embodiment is the same as the sign detection device 510 of the third embodiment, description of operation of the sign detection device 810 will not be repeated.

As described above, according to the fourth embodiment, it is possible to analyze the configuration information and the log information at the same time in single algorithm in which a data format of the log information becomes a target by converting a data format of the configuration information into the data format of the log information. With this, it is possible to detect the sign of system failure by changing the correctness in a set value of the configuration information according to a system situation.

The embodiment is not limited to the above-described embodiment, and it is possible to implement various modifications and applications within a range without departing from the scope of the embodiment.

For example, in the third and fourth embodiments, a case where each of the log files included in the log information and each of the converted files are included in the target case data is described. However, this disclosure is not limited thereto. The conversion unit may generate the target case data in which messages included in each of the generated converted files and each piece of the log information before failure recovery are sorted in chronological order based on a time stamp. The generated target case data may be stored in the storage unit.

In addition, in the first to fourth embodiments, a case where the learning method and the detection method described above are used is described. However, this disclosure is not limited thereto. For example, subsequent processing of processing for converting one of the configuration information and the log information may use another known method in the related art.

In addition, in the first and third embodiments, a case where the correct learning data and the erroneous learning data are used is described. However, this disclosure is not limited thereto. For example, only the erroneous learning data may be used.

In addition, in the first to fourth embodiments, a case where the learning unit and the detection unit are provided in the same device is described. However, this disclosure is not limited thereto. For example, function of each of the learning unit and the detection unit may be configured in separate devices.

In addition, in the third and fourth embodiments, a case where only the log information before failure recovery and the configuration information in a period corresponding before failure recovery to be converted are used is described in processing of learning and detection. However, this disclosure is not limited thereto. In a case where another learning and detection are used, the log information before and after failure recovery and the configuration information in a time corresponding before and after failure recovery to be converted may be used.

In addition, in the above description, the embodiment in which each of programs according to disclosed technology is stored (installed) in the storage devices 206 and 606 in advance is described. However, this disclosure is not limited thereto. It is possible to provide an embodiment in which each of programs according to disclosed technology is recorded in a recording medium such as a CD-ROM, a DVD-ROM, a USM memory, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process for detecting a sign of a failure of one or a plurality of information processing devices, the process comprising:

obtaining message information indicating log information of the one or the plurality of information processing devices, the message information being described in a first format;

obtaining configuration information indicating hardware configuration of the one or the plurality of information processing devices and software configuration installed in the one or the plurality of information processing devices, the configuration information being described in a second format;

executing a changing process which includes at least one of a first changing and a second changing, the message information being changed from the first format to the second format in the first changing so that both of the message information and the configuration information being described in the second format, and the configuration information being changed from the second format to the first format in the second changing so that both of the message information and the configuration information being described in the first format;

after executing of the changing process, storing the obtained message information and the obtained configuration information in a common format;

executing a comparing process that compares a predetermined pattern including predetermined message information and predetermined configuration information described in the common format and the message information and the configuration information stored in the common format; and outputting a signal indicating the sign of the failure of the one or the plurality of information processing devices.

2. The non-transitory computer-readable recording medium having stored therein a program for causing a computer to execute a process for detecting a sign according to claim 1, wherein the predetermined pattern is a pattern observed in failure state, and wherein in the outputting according to the comparing process, the signal is output when the predetermined pattern is included in the message information and the configuration information stored in the common format.

3. The non-transitory computer-readable recording medium having stored therein a program for causing a computer to execute a process for detecting a sign according to claim 1,
  wherein the predetermined pattern is a pattern observed in normal state, and
  wherein in the outputting according to the comparing process, the signal is output when the predetermined pattern is not included in the message information and the configuration information stored in the common format.

4. The non-transitory computer-readable recording medium having stored therein a program for causing a computer to execute a process for detecting a sign according to claim 1,
  wherein in the storing in the common format, two pieces of abstraction message information of the message information are obtained by using two different abstraction methods, and a combination of the two pieces of the abstraction message information and the obtained configuration information are stored in the common format.

5. The non-transitory computer-readable recording medium having stored therein a program for causing a computer to execute a process for detecting a sign according to claim 1,
  wherein in the storing in the common format, two pieces of abstraction message information of the message information are obtained by using the same abstraction methods having different parameters, and a combination of the two pieces of the abstraction message information and the obtained configuration information are stored in the common format.

6. The non-transitory computer-readable recording medium having stored therein a program for causing a computer to execute a process for detecting a sign according to claim 5,
  wherein in the storing in the common format, for the obtained message information corresponding to a predetermined period, a category that corresponds to message information is stored and converted into two categories based on each of two dictionaries of which the number of categories is different, and a combination in which the converted category is set, as a set item, based on a dictionary where the number of the categories is smaller than another dictionary among the two dictionaries and the converted category is set, as a set value of the set item, based on a dictionary where the number of the categories is larger than another dictionary among the two dictionaries, and the obtained configuration information are stored in the common format.

7. The non-transitory computer-readable recording medium having stored therein a program for causing a computer to execute a process for detecting a sign according to claim 2,
  wherein the predetermined pattern is generated while each piece of the message information and each piece of the configuration information in the one or the plurality of information processing devices in a first time and a second time, output at the first time at which the failure is generated from the one or the plurality of information processing devices and at the second time at which the failure after the first time is recovered correspond to failure information, based on information stored in the common format and the failure information in the first time.

8. The non-transitory computer-readable recording medium having stored therein a program for causing a computer to execute a process for detecting a sign according to claim 3,
  wherein the predetermined pattern is generated based on information in which the message information output at a time at which the failure is not generated from the one or the plurality of information processing devices, and the configuration information in the one or the plurality of information processing devices in the time are stored in the common format.

9. The non-transitory computer-readable recording medium having stored therein a program for causing a computer to execute a process for detecting a sign according to claim 1, wherein
  the message information obtained in the obtaining message information output from one or a plurality of information processing devices includes information of a time at which the message information is output from the one or the plurality of information processing devices, and
  the configuration information obtained in the obtaining configuration information in the one or the plurality of information processing devices includes information of an obtainment time.

10. The non-transitory computer-readable recording medium having stored therein a program for causing a computer to execute a process for detecting a sign according to claim 9,
  wherein the predetermined pattern is a pattern observed in failure state, and wherein in the outputting according to the comparing process, the signal is output when the predetermined pattern is included in the message information and the configuration information stored in chronological order in the common format.

11. The non-transitory computer-readable recording medium having stored therein a program for causing a computer to execute a process for detecting a sign according to claim 9,
  wherein the predetermined pattern is a pattern observed in normal state, and wherein in the outputting according to the comparing process, the signal is output when the predetermined pattern is not included in the message information and the configuration information stored in chronological order in the common format.

12. The non-transitory computer-readable recording medium having stored therein a program for causing a computer to execute a process for detecting a sign according to claim 9,
  wherein the configuration information includes a set item and a set value, and
  wherein in the storing in the common format, a combination of a predetermined set item and the set value of the set item among the set items of the obtained configuration information are converted into a format of the message information and are stored.

13. The non-transitory computer-readable recording medium having stored therein a program for causing a computer to execute a process for detecting a sign according to claim 12,
  wherein in the storing in the common format, the combination converted into the format of the message information is stored by repeating the combination with a predetermined time interval.

14. The non-transitory computer-readable recording medium having stored therein a program for causing a computer to execute a process for detecting a sign according to claim 10,
wherein the predetermined pattern is generated while each piece of the message information including a time output at a first time at which the failure is generated from the one or the plurality of information processing devices and each piece of information in which an obtainment time is added to the configuration information at the first time and a second time at which the failure after the first time is recovered in the one or the plurality of information processing devices, correspond to the failure information, based on information stored in chronological order in the common format and the failure information in the first time.

15. The non-transitory computer-readable recording medium having stored therein a program for causing a computer to execute a process for detecting a sign according to claim 11,
wherein the predetermined pattern is generated based on information in which the message information including a time output at a time at which the failure is not generated from the one or the plurality of information processing devices and information in which an obtainment time is added to the configuration information in the one or the plurality of information processing devices in the time are stored in chronological order in the common format.

16. A sign detection method for detecting a sign of a failure of one or a plurality of information processing devices, the method comprising:
obtaining message information indicating log information of the one or the plurality of information processing devices, the message information being described in a first format;
obtaining configuration information indicating hardware configuration of the one or the plurality of information processing devices and software configuration installed in the one or the plurality of information processing devices, the configuration information being described in a second format;
executing a changing process which includes at least one of a first changing and a second changing, the message information being changed from the first format to the second format in the first changing so that both of the message information and the configuration information being described in the second format, and the configuration information being changed from the second format to the first format in the second changing so that both of the message information and the configuration information being described in the first format;
after executing of the changing process, storing the obtained message information and the obtained configuration information in a common format;
executing a comparing process that compares a predetermined pattern including predetermined message information and predetermined configuration information described in the common format and the message information and the configuration information stored in the common format; and
outputting a signal indicating the sign of the failure of one or the plurality of information processing devices.

17. The sign detection method according to claim 16, wherein
the message information obtained in the obtaining message information output from the one or the plurality of information processing devices includes information of a time at which the message information is output from the one or the plurality of information processing devices, and
the configuration information obtained in the obtaining configuration information in the one or the plurality of information processing devices includes information of an obtainment time.

18. A sign detection device for detecting a sign of a failure of one or a plurality of information processing devices, the detection device comprising:
a memory; and
a processor coupled to the memory and configured to:
obtain message information indicating log information of the one or the plurality of information processing devices, the message information being described in a first format,
obtain the configuration information indicating hardware configuration of the one or the plurality of information processing devices and software configuration installed in the one or the plurality of information processing devices, the configuration information being described in a second format,
execute a changing process which includes at least one of a first changing and a second changing, the message information being changed from the first format to the second format in the first changing so that both of the message information and the configuration information being described in the second format, and the configuration information being changed from the second format to the first format in the second changing so that both of the message information and the configuration information being described in the first format,
after the changing process, store the obtained message information and the obtained configuration information in a common format; and
execute a comparing process that compares a predetermined pattern including predetermined message information and predetermined configuration information described in the common format and the message information and the configuration information stored in the common format, and
output a signal indicating the sign of the failure of one or the plurality of information processing devices.

19. The sign detection device according to claim 18, wherein
the message information includes information of a time at which the message information is output from the one or the plurality of information processing devices, and
the configuration information includes information of an obtainment time.

* * * * *